United States Patent
Kamen et al.

(10) Patent No.: US 12,472,253 B2
(45) Date of Patent: Nov. 18, 2025

(54) ACTIVIN A ANTIBODY FORMULATIONS AND METHODS OF USE THEREOF

(71) Applicant: Regeneron Pharmaceuticals, Inc., Tarrytown, NY (US)

(72) Inventors: Douglas Kamen, Poughquag, NY (US); Kenneth Graham, Pleasant Valley, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 554 days.

(21) Appl. No.: 17/351,354

(22) Filed: Jun. 18, 2021

(65) Prior Publication Data

US 2021/0393779 A1 Dec. 23, 2021

Related U.S. Application Data

(60) Provisional application No. 63/040,589, filed on Jun. 18, 2020.

(51) Int. Cl.
| | |
|---|---|
| *A61K 39/395* | (2006.01) |
| *A61K 39/00* | (2006.01) |
| *A61K 47/18* | (2017.01) |
| *A61K 47/22* | (2006.01) |
| *A61K 47/26* | (2006.01) |
| *C07K 16/22* | (2006.01) |

(52) U.S. Cl.
CPC .. *A61K 39/39591* (2013.01); *A61K 39/00113* (2018.08); *A61K 47/183* (2013.01); *A61K 47/22* (2013.01); *A61K 47/26* (2013.01); *C07K 16/22* (2013.01)

(58) Field of Classification Search
CPC ............ A61K 39/39591; A61K 47/183; A61K 47/22; A61K 47/26; C07K 16/22
See application file for complete search history.

(56) References Cited

U.S. PATENT DOCUMENTS

| | | | |
|---|---|---|---|
| 9,718,881 B2 * | 8/2017 | Gromada | A61P 3/04 |
| 10,195,281 B2 | 2/2019 | Benedict et al. | |
| 11,248,044 B2 * | 2/2022 | Donahue | A61P 3/04 |
| 11,407,822 B2 * | 8/2022 | Hatsell | A61K 38/179 |
| 2018/0008672 A1 | 1/2018 | Chalothorn et al. | |

FOREIGN PATENT DOCUMENTS

| | | | |
|---|---|---|---|
| CA | 2960950 A1 | 3/2016 | |
| EA | 201990613 A1 | 7/2019 | |
| WO | 2015017576 A1 | 2/2015 | |
| WO | 2018044640 A1 | 3/2018 | |
| WO | WO-2018184692 A1 * | 10/2018 | |
| WO | WO-2019099838 A1 * | 5/2019 | ............ A61K 31/18 |
| WO | 2019/169283 A1 | 9/2019 | |

OTHER PUBLICATIONS

Janeway et al. Immunology: The Immune System in Health and Disease. 5th (2001) (Year: 2001).*
International Search Report and Written Opinion for Application No. PCT/US2021/038016, dated Nov. 3, 2021, 16 pages.
Kang et al., Rapid Formulation Development for Monoclonal Antibodies. BioProcess International. Apr. 2016;14(4):40-45.
Sosabowski et al., Formulation development and manufacturing of a gastrin/CCK-2 receptor targeting peptide as an intermediate drug product for a clinical imaging study. Eur J Pharm Sci. Jun. 2007;31(2):102-11.
Wang et al., Antibody structure, instability, and formulation. J Pharm Sci. Jan. 2007;96(1):1-26.

* cited by examiner

*Primary Examiner* — Meera Natarajan
*Assistant Examiner* — Francesca Edgingtongiordano
(74) *Attorney, Agent, or Firm* — McCarter & English, LLP; Marcie B. Clarke

(57) ABSTRACT

The present invention provides novel pharmaceutical formulations comprising an antibody that specifically binds to human Activin A. The formulations may contain, in addition to an anti-Activin A antibody, a histidine buffer, an organic cosolvent, and a thermal stabilizer. The pharmaceutical formulations of the present invention exhibit a surprising degree of antibody stability after storage for several months and after being subjected to thermal and other physical stress.

23 Claims, 7 Drawing Sheets
Specification includes a Sequence Listing.

Figure 1

Heavy Chain (SEQ ID NO:9)

```
QVQLQESGPG LVKPSETLSL TCTVSGGSFS SHFWSWIRQP PGKGLEWIGY ILYTGGTSFN60
PSLKSRVSMS VGTSKNQFSL KLSSVTAADT AVYYCARARS GITFTGIIVP GSFDIWGQGT120
MVTVSSASTK GPSVFPLAPC SRSTSESTAA LGCLVKDYFP EPVTVSWNSG ALTSGVHTFP
AVLQSSGLYS LSSVVTVPSS SLGTKTYTCN VDHKPSNTKV DKRVESKYGP PCPPCPAPEF
CPPC
LGGPSVFLFP PKPKDTLMIS RTPEVTCVVV DVSQEDPEVQ FNWYVDGVEV HNAKTKPREE
QFNSTYRVVS VLTVLHQDWL NGKEYKCKVS NKGLPSSIEK TISKAKGQPR EPQVYTLPPS
QEEMTKNQVS LTCLVKGFYP SDIAVEWESN GQPENNYKTT PPVLDSDGSF FLYSRLTVDK
SRWQEGNVFS CSVMHEALHN HYTQKSLSLS LGK
```

Light Chain (SEQ ID NO:10)

```
EIVLTQSPGT LSLSPGERAT LSCRASQSVS SSYLAWYQQK PGQAPRLLIY GASSRATGIP
DRFSGSGSGT DFTLTISRLE PEDFAVYYCQ QYGSSPWTFG QGTKVEIKRT VAAPSVFIFP
PSDEQLKSGT ASVVCLLNNF YPREAKVQWK VDNALQSGNS QESVTEQDSK DSTYSLSSTL
    TLSKADYEKH KVYACEVTHQ GLSSPVTKSF NRGEC
```

ACTIVIN A ANTIBODY FORMULATIONS AND METHODS OF USE THEREOF

RELATED APPLICATIONS

The instant application claims priority to U.S. Provisional Application No. 63/040,589, filed on Jun. 18, 2020, the entire contents of which are expressly incorporated herein by reference in their entireties.

SEQUENCE LISTING

The instant application contains a Sequence Listing which has been submitted electronically in ASCII format and is hereby incorporated by reference in its entirety. Said ASCII copy, created on Aug. 30, 2021, is named 118003-75702_SL.txt and is 9,972 bytes in size.

FIELD

The present invention relates to the field of therapeutic antibody formulations. More specifically, the present invention relates to the field of pharmaceutical formulations comprising an antibody that specifically binds to human Activin A.

BACKGROUND

Fibrodysplasia ossificans progressiva (FOP), also known as Munchmeyer disease, is an autosomal dominant disorder characterized by early onset, episodic and progressive ossification of skeletal muscle and associated connective tissue. In FOP subjects, bone forms in soft tissue outside of the normal skeleton, a process known as heterotopic ossification (HO), which can lead to the development of a secondary skeleton and progressively restricts the patient's ability to move. Removal of the new bone formation has been shown to be ineffective and leads to the development of additional new bone growth.

FOP is driven by mutations in the intracellular domain of ACVR1 (ALK2), with the great majority altering Arginine 206 to Histidine (R206H) (Pignolo, R. J. et al. 2011, *Orphanet J. Rare Dis.*6:80). ACVR1 is a type I receptor for bone morphogenic proteins (BMPs). The R206H mutation, among others, is believed to increase the sensitivity of the receptor to activation and render it more resistant to silencing.

Although certain types of drugs have been used to relieve pain and swelling associated with FOP during flare-ups, no effective medical treatment is currently known for FOP. Antibodies to Activin A are one example of a therapeutically relevant macromolecule that requires proper formulation. Although some anti-Activin A antibodies are known, there nonetheless remains a need in the art for novel pharmaceutical formulations comprising anti-Activin A antibodies that are sufficiently stable and suitable for administration to patients.

SUMMARY

Methods to produce antibodies useful as human therapeutics include generation of chimeric antibodies and humanized antibodies (see, for example, U.S. Pat. No. 6,949,245). Sec, for example, WO 94/02602 (Abgenix) and U.S. Pat. No. 6,596,541 (Regeneron Pharmaceuticals), which publications are herein specifically incorporated by reference, describing methods of generating nonhuman transgenic mice capable of producing human antibodies. U.S. Pat. No. 9,718,881 discloses antibodies to human Activin A, and is incorporated in its entirety herein by reference.

Therapeutic antibodies must be formulated in a manner that not only makes the antibodies suitable for administration to patients, but also in a manner that maintains their stability during storage and subsequent use. For example, therapeutic antibodies in liquid solution are prone to fragmentation, precipitation, aggregation, and undesired chemical modifications unless the solution is formulated properly. The stability of an antibody in liquid formulation depends not only on the kinds of excipients used in the formulation, but also on the amounts and proportions of the excipients relative to one another. Furthermore, other considerations aside from stability must be taken into account when preparing a liquid antibody formulation. Examples of such additional considerations include the viscosity of the solution and the concentration of antibody that can be accommodated by a given formulation, and the visual quality or appeal of the formulation. Thus, when formulating a therapeutic antibody, great care must be taken to arrive at a formulation that remains stable, contains an adequate concentration of antibody, and possesses a suitable viscosity as well as other properties which enable the formulation to be conveniently administered to patients.

The present invention satisfies the aforementioned need by providing pharmaceutical formulations comprising a human antibody that specifically binds to human Activin A.

In one aspect, a liquid pharmaceutical formulation is provided, comprising: (i) an antibody that specifically binds to Activin A; (ii) a buffer; (iii) an organic cosolvent; and (iv) thermal stabilizers.

In another aspect, the present invention provides a pharmaceutical formulation comprising: (i) an anti-human Activin A antibody, or antigen-binding portion thereof; (ii) a buffer at pH of 6.3±0.3; (iii) an organic cosolvent; and (iv) one or more thermal stabilizers.

In some embodiments, the antibody, or the antigen-binding portion thereof, comprises the following six CDR sequences: (a) an HCDR1 having the sequence GGSFSSHF (SEQ ID NO.: 1); (b) an HCDR2 having the sequence ILYTGGT (SEQ ID NO: 2); (c) an HCDR3 having the sequence ARARSGITFTGIIVPGSFDI (SEQ ID NO: 3); (d) an LCDR1 having the sequence QSVSSSY (SEQ ID NO: 4); (e) an LCDR2 having the sequence GAS (SEQ ID NO: 5); and (f) an LCDR3 having the sequence QQYGSSPWT (SEQ ID NO: 6).

In some embodiments, the antibody has a molecular weight of about 145,235.3 Da.

In some embodiments, the concentration of the antibody, or the antigen-binding portion thereof, is 60 mg/mL±6 mg/mL.

In some embodiments, the buffer is a histidine buffer. In some embodiments, the histidine concentration is 10 mM±2 mM.

In some embodiments, the organic cosolvent is polysorbate 20. In some embodiments, the polysorbate 20 concentration is 0.05% w/v±0.025%.

In some embodiments, the one or more thermal stablilizers comprise sucrose and arginine. In some embodiments, the sucrose concentration is 5%±1% (w/v) and the Arginine concentration is 70 mM±14 mM.

In some embodiments, the pharmaceutical formulation comprises 60 mg/mL±6 mg/mL antibody, 10 mM±2 mM histidine, pH 6.3±0.3, 0.05% w/v+0.025% polysorbate 20, 5% w/v±1% sucrose, and 70 mM±14 mM Arginine.

In some embodiments, after 56 days of storage at 40° C. and 75% relative humidity (RH), at least 90% of the antibody, or the antigen-binding portion thereof, has native conformation, or at least 30% of the antibody, or the antigen-binding portion thereof, is the main charge form.

In some embodiments, after 56 days of storage at 40° C. and 75% RH, at least 93% of the antibody, or the antigen-binding portion thereof, has native conformation, or at least 34.5% of the antibody, or the antigen-binding portion thereof, is the main charge form.

In some embodiments, after 56 days of storage at 40° C. and 75% RH, at least 97% of the antibody, or the antigen-binding portion thereof, has native conformation, or at least 45% of the antibody, or the antigen-binding portion thereof, is the main charge form.

In some embodiments, after six months of storage at 25° C. and 60% RH, at least 90% of the antibody, or the antigen-binding portion thereof, has native conformation, or at least 40% of the antibody, or the antigen-binding portion thereof, is the main charge form.

In some embodiments, after six months of storage at 25° C. and 60% RH, at least 95% of the antibody, or the antigen-binding portion thereof, has native conformation, or at least 45% of the antibody, or the antigen-binding portion thereof, is the main charge form.

In some embodiments, after six months of storage at 25° C. and 60% RH, at least 98% of the antibody, or the antigen-binding portion thereof, has native conformation, or at least 50% of the antibody, or the antigen-binding portion thereof, is the main charge form.

In some embodiments, after 12 months of storage at 2-8° C., at least 94% of the antibody, or the antigen-binding portion thereof, has native conformation, at least 45% of the antibody, or the antigen-binding portion thereof, is the main charge variant, and/or the antibody retains at least 100% of the potency of the antibody, or the antigen-binding portion thereof, prior to storage.

In some embodiments, after 12 months of storage at 2-8° C., at least 96% of the antibody, or the antigen-binding portion thereof, has native conformation, at least 50% of the antibody, or the antigen-binding portion thereof, is the main charge variant, and/or the antibody retains at least 100% of the potency of the antibody, or the antigen-binding portion thereof, prior to storage.

In some embodiments, after 12 months of storage at 2-8° C., at least 98% of the antibody, or the antigen-binding portion thereof, has native conformation, at least 55% of the antibody, or the antigen-binding portion thereof, is the main charge variant, and/or the antibody retains at least 100% of the potency of the antibody, or the antigen-binding portion thereof, prior to storage.

In some embodiments, after 18 months of storage at 2-8° C., at least 94% of the antibody, or the antigen-binding portion thereof, has native conformation, at least 45% of the antibody, or the antigen-binding portion thereof, is the main charge variant, and/or the antibody retains at least 95% of the potency of the antibody, or the antigen-binding portion thereof, prior to storage.

In some embodiments, after 18 months of storage at 2-8° C., at least 96% of the antibody, or the antigen-binding portion thereof, has native conformation, at least 50% of the antibody, or the antigen-binding portion thereof, is the main charge variant, and/or the antibody retains at least 95% of the potency of the antibody, or the antigen-binding portion thereof, prior to storage.

In some embodiments, after 18 months of storage at 2-8° C., at least 98% of the antibody, or the antigen-binding portion thereof, has native conformation, at least 55% of the antibody, or the antigen-binding portion thereof, is the main charge variant, and/or the antibody retains at least 95% of the potency of the antibody, or the antigen-binding portion thereof, prior to storage.

In some embodiments, after 24 months of storage at 2-8° C., at least 94% of the antibody, or the antigen-binding portion thereof, has native conformation, at least 45% of the antibody, or the antigen-binding portion thereof, is the main charge variant, and/or the antibody retains at least 95% of the potency of the antibody, or the antigen-binding portion thereof, prior to storage.

In some embodiments, after 24 months of storage at 2-8° C., at least 96% of the antibody, or the antigen-binding portion thereof, has native conformation, at least 50% of the antibody, or the antigen-binding portion thereof, is the main charge variant, and/or the antibody retains at least 95% of the potency of the antibody, or the antigen-binding portion thereof, prior to storage.

In some embodiments, after 24 months of storage at 2-8° C., at least 98% of the antibody, or the antigen-binding portion thereof, has native conformation, at least 55% of the antibody, or the antigen-binding portion thereof, is the main charge variant, and/or the antibody retains at least 95% of the potency of the antibody, or the antigen-binding portion thereof, prior to storage.

In another aspect, the present invention provides a pharmaceutical formulation comprising (a) 60 mg/mL±10 mg/mL of an anti-human Activin A antibody, or antigen-binding portion thereof (b) 10 mM±2 mM histidine, pH 6.3±0.3, (c) 0.05%+0.025% polysorbate 20, (d) 70 mM±14 mM Arginine, and (c) 5%+1% sucrose, wherein the antibody, or the antigen-binding portion thereof, comprises a heavy chain variable region having at least 90%, at least 91%, at least 92%, at least 93%, at least 94%, at least 95%, at least 96%, at least 97%, at least 98%, at least 99% identity to, comprises, or consists of SEQ ID NO: 7 and a light chain variable region having at least 90%, at least 91%, at least 92%, at least 93%, at least 94%, at least 95%, at least 96%, at least 97%, at least 98%, at least 99% identity to, comprises, or consists of SEQ ID NO: 8. In one embodiment, the heavy chain comprises a sequence having at least 90%, at least 91%, at least 92%, at least 93%, at least 94%, at least 95%, at least 96%, at least 97%, at least 98%, at least 99% identity to, comprises, or consists of SEQ ID NO:9. In one embodiment, the heavy chain comprises a sequence having at least 90%, at least 91%, at least 92%, at least 93%, at least 94%, at least 95%, at least 96%, at least 97%, at least 98%, at least 99% identity to, comprises, or consists of SEQ ID NO:10.

In some embodiments, the formulation is contained in a container. In some embodiments, the container is a vial. In some embodiments, the vial is glass. In some embodiments, the glass is Type 1 borosilicate glass with a FluroTec® coated 4432/50 butyl rubber stopper.

In some embodiments, the formulation is suitable for intravenous administration to a human subject in need thereof. In some embodiments, the formulation is suitable for subcutaneous administration to a human subject in need thereof.

In some embodiments, the formulation is a liquid formulation. In some embodiments, the formulation is a lyophilized formulation.

In another aspect, the present invention provides a kit comprising a pharmaceutical formulation disclosed herein, a container, and instructions of use thereof.

In some embodiments, the container is a glass vial fitted with a FluroTec® coated chlorobutyl stopper.

In another aspect, the present invention provides a method of treating a disease or disorder associated with Activin A activity, the method comprising administration of a therapeutically effective amount of one or more of the pharmaceutical compositions disclosed herein, to a subject in need thereof.

In some embodiments, the disease or disorder associated with Activin A activity is Fibrodysplasia ossificans progressiva (FOP).

Other embodiments of the present invention will become apparent from a eview of the ensuing detailed description.

BRIEF DESCRIPTION OF DRAWINGS

FIG. 1 shows the heavy and light chain amino acid sequences (SEQ ID NO:9 and SEQ ID NO: 10, respectively) of an exemplary anti-activin A monoclonal antibody.

DETAILED DESCRIPTION

Figure 2:
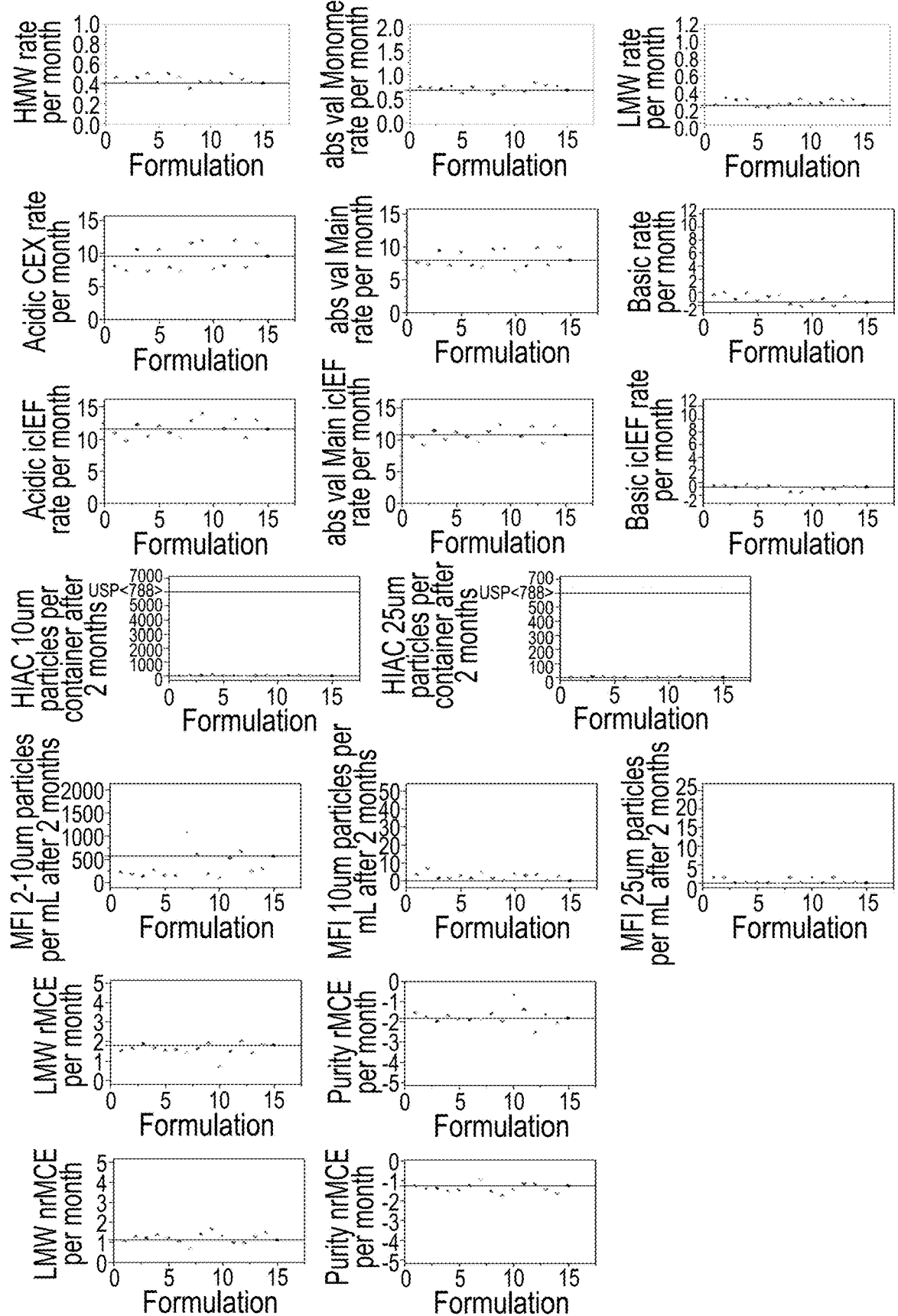
FIG. 2 shows the effect of varying the formulation on the rate of an anti-activin A antibody degradation when it is incubated at 40° C./75% RH for 2 months. For particle levels by HIAC and MFI the results shown are the final particle levels after 2 months of incubation (USP<788> limits are indicated for the HIAC results). Formulation 15 is the control formulation in which all factors are nominal. The line is a reference line indicating the rate of change of the response for the control formulation.
Figure 3:
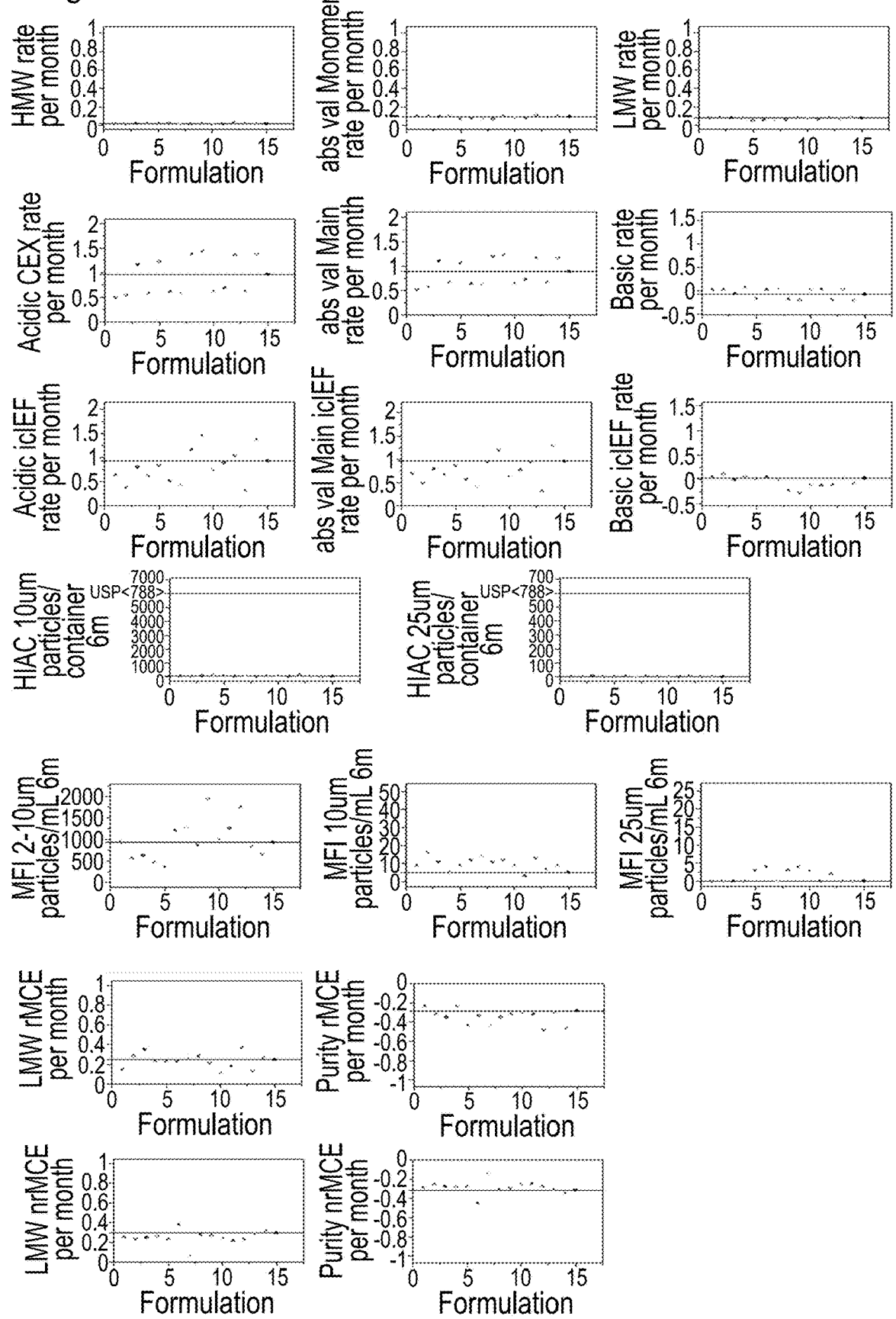
FIG. 3 shows the effect of varying the formulation on the rate of an anti-activin A antibody degradation when it is incubated at 25° C./60% RH for 6 months. For particle levels by HIAC and MFI the results shown are the final particle levels after 6 months of incubation (USP<788> limits are indicated for the HIAC results). Formulation 15 is the control formulation in which all factors are nominal. The line is a reference line indicating the rate of change of the response for the control formulation.
Figure 4:
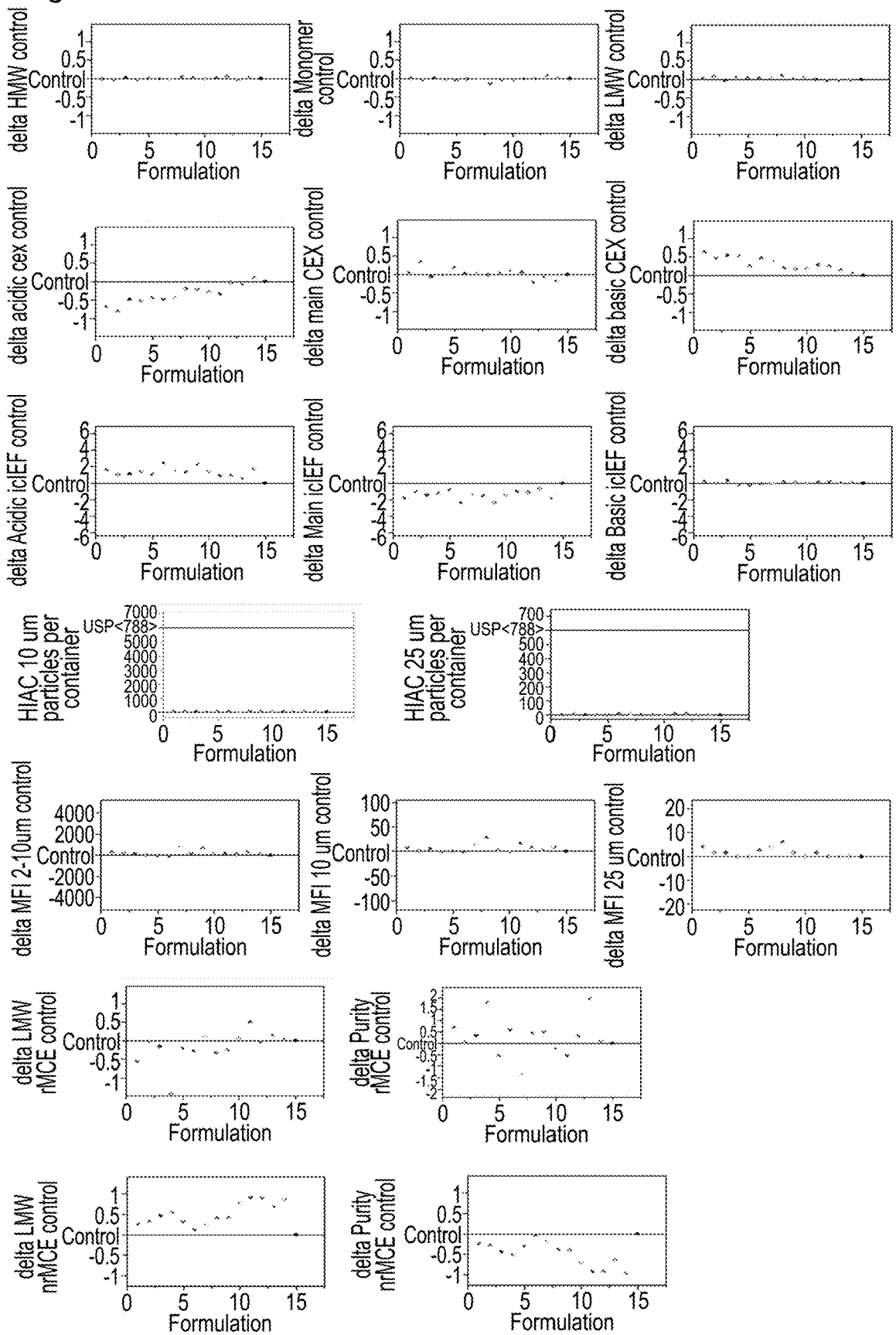
FIG. 4 shows the effects of varying the formulation components in accordance with the DOE design on the stability of an anti-activin A antibody relative to the control formulation, indicated as "delta control" (8 cycles of freezing and thawing stress, −30° C. freeze, room temperature thaw; control formulation is F15). Results for particle levels by HIAC are shown as final particle levels after 8 cycles of freezing and thawing and are compared to the limits specified in USP<788>.
Figure 5:
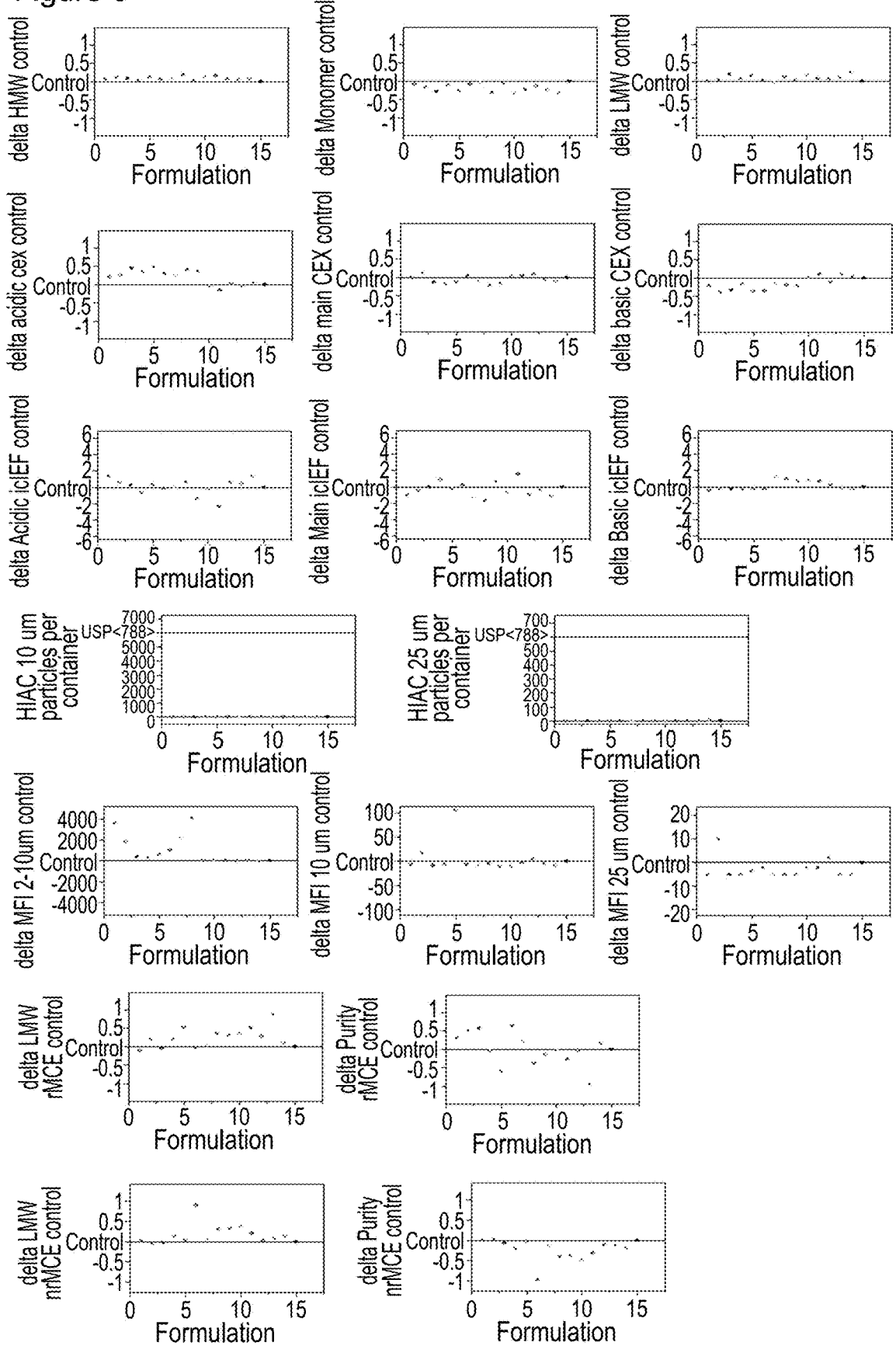
FIG. 5 shows the effects of varying the formulation components in accordance with the DoE design on the stability of an anti-activin A antibody relative to the control formulation, indicated as "delta control" (120 minute agitation by vortexing; control formulation is F15). Results for particle levels by HIAC are shown as final particle levels after 120 minutes of agitation and are compared to the limits specified in USP<788>.

Before the present invention is described, it is to be understood that this invention is not limited to particular methods and experimental conditions described, as such methods and conditions may vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. As used herein, the term "about", when used in reference to a particular recited numerical value or range of values, means that the value may vary from the recited value by no more than 5%. For example, as used herein, the expression "about 100" includes 95 and 105 and all values in between (e.g., 95.00, 95.01, 95.02, 95.03, 95.04, . . . , 104.96, 104.97, 104.98, 104.99, 105.00).

Although any methods and materials similar or equivalent to those described herein can be used in the practice or testing of the present invention, the preferred methods and materials are now described. All publications mentioned herein are incorporated herein by reference in their entirety.
Pharmaceutical Formulations As used herein, the expression "pharmaceutical formulation" means a combination of at least one active ingredient (e.g., a small molecule, macromolecule, compound, etc. which is capable of exerting a biological effect in a human or non-human animal), and at least one inactive ingredient which, when combined with the active ingredient or one or more additional inactive ingredients, is suitable for therapeutic administration to a human or non-human animal. The term "formulation", as used herein, means "pharmaceutical formulation" unless specifically indicated otherwise. The present invention provides pharmaceutical formulations comprising at least one therapeutic polypeptide. According to certain embodiments of the present invention, the therapeutic polypeptide is an antibody, or an antigen-binding fragment thereof, which binds specifically to human Activin A protein. More specifically, the present invention includes pharmaceutical formulations that comprise: (i) a human antibody that specifically binds to human Activin A (ii) a histidine buffer; (iii) an organic cosolvent that is a non-ionic surfactant; and (iv) a stabilizer that is a carbohydrate or an inorganic salt, or a combination of carbohydrate and inorganic salt. Specific exemplary components and formulations included within the present invention are described in detail below.
Anti-Activin A Antibodies The pharmaceutical formulations of the present invention may comprise a human antibody, or an antigen-binding fragment thereof, that binds specifically to human Activin A. As used herein, the term "Activin A" means a human Activin A, which is a homo- or heterodimeric protein. The homodimeric protein contains a homodimeric beta A subunit pair. The heterodimeric protein contains a beta subunit and a beta B, beta C or beta E subunit (i.e., beta A beta B, beta A beta C, or beta A beta E. The subunits are each expressed as precursor polypeptides including a signal peptide, propeptide and mature polypeptide. An exemplary form of human beta A subunit precursor is a polypeptide of length 426 amino acids designated Swiss Prot P08476 of which residues 1-20 are a signal peptide, residues 21-310 are a propeptide and residues 311-426 are the mature polypeptide. An exemplary form of a beta B subunit precursor polypeptide is designated Swiss Prot P09529 of which residues 1-28 are a signal peptide, residues 29-292 a propeptide and residues 293-407 a mature polypeptide. An exemplary form of a beta C subunit is designated Swiss Prot P55103, of which residues 1-18 are a signal peptide, residues 19-236 are a propeptide and residues 237-352 are a mature polypeptide. An exemplary form of a beta E subunit precursor is designated Swiss Prot P58166 of which residues 1-19 are a signal peptide, residues 20-236 are a propeptide and residues 237-350 are a mature polypeptide. Several variants of these sequences are known as described in the Swiss Prot Data base. Reference to Activin A includes any of the beta A homodimer, beta A beta B, beta A beta C and beta A beta E heterodimer forms, as well as their subunits, as well as their precursors in which subunits are attached to the propeptide and/or signal peptide defined by the exemplary Swiss Prot sequences provided or other natural occurring human forms of these sequences. Activin A signals through binding to ACVR2A or ACVR2B, but is not known to be a ligand for ACVR1. Activin A signals aberrantly via mutant ACVR to transduce osteogenic signals and trigger heterotopic bone formation.

The term "antibody", as used herein, is generally intended to refer to immunoglobulin molecules comprising four polypeptide chains: two heavy (H) chains and two light (L) chains inter-connected by disulfide bonds, as well as multimers thereof (e.g., IgM); however, immunoglobulin molecules consisting of only heavy chains (i.e., lacking light chains) are also encompassed within the definition of the term "antibody". Each heavy chain comprises a heavy chain variable region (abbreviated herein as HCVR or $V_H$) and a heavy chain constant region. The heavy chain constant region comprises three domains, CH1, CH2 and CH3. Each light chain comprises a light chain variable region (abbreviated herein as LCVR or $V_L$) and a light chain constant region. The light chain constant region comprises one domain (CL1). The $V_H$ and $V_L$ regions can be further subdivided into regions of hypervariability, termed complementary determining regions (CDRs), interspersed with regions that are more conserved, termed framework regions (FR). Each $V_H$ and $V_L$ is composed of three CDRs and four FRs, arranged from amino-terminus to carboxy-terminus in the following order: FR1, CDR1, FR2, CDR2, FR3, CDR3, FR4.

Unless specifically indicated otherwise, the term "antibody", as used herein, shall be understood to encompass complete antibody molecules as well as antigen-binding fragments thereof. The term "antigen-binding portion" or "antigen-binding fragment" of an antibody (or simply "antibody portion" or "antibody fragment"), as used herein, refers to one or more fragments of an antibody that retain the ability to specifically bind to human Activin A or an epitope thereof.

An "isolated antibody", as used herein, is intended to refer to an antibody that is substantially free of other antibodies having different antigenic specificities (e.g., an isolated antibody that specifically binds human Activin A is substantially free of antibodies that specifically bind antigens other than human Activin A), with the notable exception of bi-specific (or multi-specific) antibodies that specifically bind Activin A on the one hand, and another epitope on the other. Moreover, an isolated antibody may be substantially free of other cellular material or chemicals.

The term "specifically binds", or the like, means that an antibody or antigen-binding fragment thereof forms a complex with an antigen that is relatively stable under physiologic conditions. Specific binding can be characterized by a dissociation constant of at least about $1 \times 10^{-6}$ M or greater. Methods for determining whether two molecules specifically bind are well known in the art and include, for example, equilibrium dialysis, surface plasmon resonance, and the like. An isolated antibody that specifically binds human Activin A may, however, have cross-reactivity to other antigens, such as Activin A molecules from other species (orthologs). In the context of the present invention, multispecific (e.g., bispecific) antibodies that bind to human Activin A as well as one or more additional antigens are deemed to "specifically bind" human Activin A.

Exemplary anti-human Activin A antibodies that may be included in the pharmaceutical formulations of the present invention are set forth in U.S. Pat. No. 9,718,881, the disclosure of which is incorporated herein by reference in their entirety.

Antibodies can also include antibodies specifically binding to Activin A. Such antibodies can specifically bind to any or all of the beta A beta A, beta A beta B, beta A beta C and beta A beta E forms of Activin A. Some antibodies specifically bind to only one of these forms (i.e., beta A beta A, beta A beta B, beta A beta C or beta A beta E). Specificity for the beta A beta B, beta A beta C and beta A beta E forms can be conferred by an epitope within the beta B, beta C or beta E subunit, respectively, or for an epitope to which both components of the heterodimer contribute. Specificity for beta A beta can be conferred by an epitope contributed by both molecules within the homodimer (e.g., at the interface of subunits). Some antibodies specifically bind to all of these forms of Activin A, in which case the epitope is typically on the beta A subunit. Antibodies typically have epitopes within the mature polypeptide component of the precursor proteins. Some antibodies specifically bind to any or all forms of Activin A without binding to human inhibin, which exists in the form of alpha (Swiss Prot P05111) beta A or alpha beta B heterodimers. Some antibodies specifically bind to any or all forms of Activin A and bind to either or both forms of human inhibin. Although it is believed that such antibodies inhibit signal transduction of Activin A through one or more of its counterreceptors, ACVR2A and/or ACVR2B and/or BMPR2, an understanding of mechanism is not required for use of such antibodies in methods of treating FOP.

A substantial number of antibodies against Activin A have been described. For example, US20150037339 discloses human antibodies designated H4H10423P, H4H10424P, H4H10426P, H4H10429P, H4H10430P, H4H10432P2, H4H10433P2, H4H10436P2, H4H10437P2, H4H10438P2, H4H10440P2, H4H10442P2, H4H10445P2, H4H10446P2, H4H10447P2, H4H10447P2, H4H10448P2, H4H10452P2.

Preferred antibodies have an affinity for Activin A (measured at 25° C. as in Example 3 of U.S. Pat. No. 9,718,881) of at least $10^8$ M$^{-1}$, $10^9$ M$^{-1}$, $10^{10}$ M$^{-1}$, $10^{11}$ M$^{-1}$, $10^{12}$ M$^{-1}$, or $10^{13}$ M$^{-1}$. Some antibodies have an affinity within a range of $10^9$-$10^{12}$ M$^{-1}$. Preferred antibodies inhibit signal transduction of Activin A with an IC50 of less than 4 nM, and preferably less than 400 pM or 40 pM. Some antibodies inhibit signal transduction with and IC50 in a range of 4 nM to 10 pM or 3.5 nM to 35 pM.

Signal transduction inhibition can be measured as in Example 6 of U.S. Pat. No. 9,718,881, which is summarized as follows. A human A204 rhabdomyosarcoma cell line is transfected with a Smad 2/3-luciferase reporter plasmid to produce the A204/CAGAx 12-Luc cell line. A204/

CAGAx12-Luc cells were maintained in McCoy's 5A supplemented with 10% fetal bovine serum, penicillin/streptomycin/glutamine and 250 µg/mL of G418. For the bioassay, A204/CAGAx 12-Luc cells were seeded onto 96-well assay plates at 10,000 cells/well in low serum media, 0.5% FBS and OPTIMEM, and incubated at 37° C. and 5% $CO_2$ overnight. Activin A is serially diluted at 1:3 from 100 to 0.002 nM and added to cells starting along with a control containing no Activin. Antibodies are serially diluted at 1:3 starting from 100 to 0.002 nM, 1000 to 0.02 nM, or 300 to 0.005 nM including control samples containing either an appropriate isotype control antibody or no antibody and added to cells with a constant concentration of 100 pM Activin A.

Some antibodies inhibit binding of Activin A to ACVR2A and/or ACVR2B and/or BMPR2 by at least 1%, 5%, 10%, 20%, 30%, 40%, 50%, 60%, 70%, 80%, 90%, 95%, 99%, as measured when the receptor is expressed from a cell or the extracellular domain is fused with an Fc domain as a fusion protein, and the fusion protein is immobilized to support (e.g., a Biacore sensor chip). In such measurements, the antibody and Activin A should be present in equimolar amounts and the receptor or extracellular domain in excess.

An exemplary antibody used in the present examples is designated H4H10446P in U.S. Pat. No. 9,718,881. Its heavy chain variable region and heavy chain CDR1, CDR2 and CDR3 having the amino acid sequences of SEQ ID NOs: 162, 164, 166 and 168, respectively, of U.S. Pat. No. 9,718,881. Its light chain variable region and light chain CDRs, CDRL1, CDRL2 and CDRL3 having the amino acid sequences of SEQ ID NO: 146, 148, 150 and 152, respectively, of US2015/0037339. H4H10446P inhibits Activin A mediated signaling through ACVR2A and/or ACVR1IB, but does not inhibit strongly, if at all, Activin A binding to ACRIIA or ACVR2B. Other antibodies competing with H4H10446P for binding to human Activin A or binding to the same epitope on human Activin A as H4H10446P are included and sharing its inhibition of signaling are also included.

Another exemplary antibody for use in the present methods is designated H4H10430P in U.S. Pat. No. 9,718,881. Its heavy chain variable region and heavy chain CDRs CDRH1, CDRH2 and CDRH3 having the amino acid sequences of SEQ ID NOs: 66, 68, 70 and 72, respectively, in U.S. Pat. No. 9,718,881. Its light chain variable region and light chain CDRs, CDRL1, CDRL2 and CDRL3 having the amino acid sequences of SEQ ID NOs: 74, 76, 78 and 80, respectively, in U.S. Pat. No. 9,718,881. This antibody inhibits binding of Activin A to ACRV2A and/or ACVR2B and inhibits signal transduction through one or both of these receptors. Other antibodies competing with H4H10430P for binding to Activin A or binding to the same epitope on Activin A as H4H10430P and sharing its property of inhibiting Activin A binding to and signal transduction through ACVR2A and ACVR2B are also included.

An exemplary antibody for use in the present methods is garetosmab. The recombinant monoclonal antibody garetosmab is a covalent heterotetramer consisting of two disulfide-linked human heavy chains (IgG4 isotype), each covalently linked through a disulfide bond to a human kappa light chain. Based on the primary sequence, the antibody without glycans possesses a predicted molecular weight of 145,235.3 Da, assuming the formation of 16 canonical disulfide bonds and removal of Lys453 from each heavy chain C-terminus. Each heavy chain contains a serine-to-proline mutation at amino acid Pro234 within the hinge region of the Fc domain, to reduce the propensity of the IgG4 isotype antibody to form half-antibodies in solution. There is a single N-linked glycosylation site (Asn303) on each heavy chain, located within the constant region in the Fc domain of the molecule. The complementarity-determining regions (CDRs) within the garetosmab heavy chain and light chain variable domains together form the binding site for its targets: activin A, activin AB, and activin AC. The heavy and light chain amino acid sequences, the location of the CDRs within each polypeptide chain, the location of the heavy chain N-linked glycosylation site, and the predicted disulfide bond structures of the garetosmab monoclonal antibody are presented in FIG. 1.

In some embodiments, the anti-human Activin A antibody comprises one or more amino acid substitutions in one or more framework regions relative to the canonical heavy chain variable region, which is reasonably expected to result in an altered charge distribution across the exposed surface of the antibody, and therefore affect its interaction with the surrounding solvent and excipients.

The amount of antibody, or antigen-binding fragment thereof, contained within the pharmaceutical formulations of the present invention may vary depending on the specific properties desired of the formulations, as well as the particular circumstances and purposes for which the formulations are intended to be used. In certain embodiments, the pharmaceutical formulations are liquid formulations that may contain 20 mg/mL±2 mg/mL to 200 mg/mL±20 mg/mL of antibody; 30±3 mg/mL to 150±15 mg/mL of antibody; 40±4 mg/mL to 100±1 mg/mL of antibody; 45±4.5 mg/mL to 80±8 mg/mL of antibody; 50±5 mg/mL to 60±6 mg/mL of antibody; 55±5.5 mg/mL to 60±6 mg/mL of antibody; about 50 mg/mL; 50 mg/mL; 60 mg/mL±6 mg/mL; about 60 mg/mL; 60 mg/mL; about 70 mg/mL; or 70 mg/mL of an antibody or an antigen-binding fragment thereof, that binds specifically to human Activin A.

Excipients and pH

The pharmaceutical formulations of the present invention comprise one or more excipients. The term "excipient", as used herein, means any non-therapeutic agent added to the formulation to provide a desired consistency, viscosity or stabilizing effect.

In certain embodiments, the pharmaceutical formulation of the invention comprises at least one organic cosolvent in a type and in an amount that stabilizes the human Activin A antibody under stress conditions of rough handling or agitation, such as, e.g., vortexing, or freezing and thawing. In some embodiments, what is meant by "stabilizes" is the maintenance of at least 95% of the Activin A antibody in its native state, i.e., not fragmented or aggregated, of antibody (on a molar basis) over the course of rough handling, such as by vortexing the antibody-organic cosolvent solution for about 30 minutes, 60 minutes or about 120 minutes, or by freezing and thawing the antibody-organic cosolvent solution for 4 cycles or 8 cycles.

In certain embodiments, the organic cosolvent is a non-ionic surfactant, such as an alkyl poly(ethylene oxide). Specific non-ionic surfactants that can be included in the formulations of the present invention include, e.g., polysorbates such as polysorbate 20, polysorbate 28, polysorbate 40, polysorbate 60, polysorbate 65, polysorbate 80, polysorbate 81, and polysorbate 85; poloxamers such as poloxamer 181, poloxamer 188, poloxamer 407; or polyethylene glycol (PEG). Polysorbate 20 is also known as TWEEN 20, sorbitan monolaurate and polyoxyethylenesorbitan monolaurate. Poloxamer 188 is also known as PLURONIC F68.

The amount of non-ionic surfactant contained within the pharmaceutical formulations of the present invention may vary depending on the specific properties desired of the formulations, as well as the particular circumstances and purposes for which the formulations are intended. In certain embodiments, the formulations may contain 0.01%±0.0015% to 1%±0.15% surfactant. For example, the formulations of the present invention may comprise about 0.0085%; about 0.01%; about 0.02%; about 0.03%; about 0.04%; about 0.05%; about 0.06%; about 0.07%; about 0.08%; about 0.09%; about 0.1%; about 0.11%; about 0.12%; about 0.13%; about 0.14%; about 0.15%; about 0.16%; about 0.17%; about 0.18%; about 0.19%; about 0.20%; about 0.21%; about 0.22%; about 0.23%; about 0.24%; about 0.25%; about 0.3%; about 0.4%; about 0.5%; about 0.6%; about 0.7%; about 0.8%; about 0.9%; about 1%; about 1.1%; about 1.15%; or about 1.2% polysorbate 20.

The pharmaceutical formulations of the present invention may also comprise one or more stabilizers in a type and in an amount that stabilizes the human Activin A antibody under conditions of thermal stress. In some embodiments, what is meant by "stabilizes" is maintaining greater than about 90% of the antibody in a native conformation when the solution containing the antibody and the thermal stabilizer is kept at about 2-8° C. for up to about 18 months, at about 25° C. for up to about 6 months, or at about 40° C. for up to about 56 days. In some embodiments, what is meant by "stabilizes" is maintaining greater than about 90% of the antibody in a native conformation when the solution containing the antibody, or antigen-binding fragment thereof, and the thermal stabilizer is kept at about 2-8° C. for up to about 24 months. As used herein, "native" means the major form of the antibody by size exclusion, which is generally an intact monomer of the antibody.

In certain embodiments, the thermal stabilizer is a sugar or sugar alcohol selected from sucrose, sorbitol, glycerol, trehalose and mannitol, or any combination thereof, the amount of which contained within the formulation can vary depending on the specific circumstances and intended purposes for which the formulation is used. In certain embodiments, the formulations may contain about 5% to about 40% sugar or sugar alcohol; about 1% to about 20% sugar or sugar alcohol; about 5% to about 15% sugar or sugar alcohol; about 7.5% to about 12.5% sugar or sugar alcohol; about 10% sugar or sugar alcohol; 10%+1.5% sugar or sugar alcohol; or 10% sugar or sugar alcohol. For example, the pharmaceutical formulations of the present invention may comprise 1%±0.2%; 2%±0.4%; 3%±0.6%; 4%±0.8%; 5%±1%; 6%±1.2%; 7%±1.4%; 8%±1.6%; 9%±1.8%; 10%±2%; 11%±2.2%; 12%±2.4%; 13%±2.6%; 14%±2.8%; or about 15%±3% (w/v) of sugar or sugar alcohol (e.g., sucrose).

In certain embodiments, the thermal stabilizer is an amino acid (e.g., arginine), the amount of which contained within the formulation can vary depending on the specific circumstances and intended purposes for which the formulation is used. In certain embodiments, the formulations may contain about 0 mM to about 150 mM arginine; about 10 mM to about 140 mM arginine; about 20 mM to about 130 mM arginine; about 30 mM to about 120 mM arginine; about 40 mM to about 110 mM arginine; about 50 mM to about 100 mM arginine; about 60 mM to about 90 mM arginine; about 70 mM to about 80 mM arginine; or about 70 mM arginine. For example, the pharmaceutical formulations of the present invention may comprise 0 mM; 10 mM±2 mM arginine; 20 mM±4 mM arginine; 30 mM±6 mM arginine; 40 mM±8 mM arginine; 50 mM±10 mM arginine; 60 mM±12 mM arginine; 70 mM±14 mM arginine; about 70 mM arginine; or 70 mM arginine.

The pharmaceutical formulations of the present invention may also comprise a buffer or buffer system, which serves to maintain a stable pH and to help stabilize the human Activin A antibody. In some embodiments, what is meant by "stabilizes" is wherein at least 90% of the antibody is in its native conformation as determined by size exclusion chromatography when the solution containing the antibody and the buffer is kept at about 2-8° C. for up to about 18 months, at about 25° C. for up to about 6 months, or at about 40° C. for up to about 56 days. In some embodiments, what is meant by "stabilizes" is wherein at least 90% of the antibody is in its native conformation as determined by size exclusion chromatography when the solution containing the antibody, or the antigen-binding fragment thereof, and the buffer is kept at about 2-8° C. for up to about 24 months. By "native" or "native conformation", what is meant is the antibody fraction that is not aggregated or degraded. This is generally determined by an assay that measures the relative size of the antibody entity, such as a size exclusion chromatographic assay. The non-aggregated and non-fragmented antibody elutes at a fraction that equates to the native antibody, and is generally the main elution fraction. Aggregated antibody elutes at a fraction that indicates a size greater than the native antibody. Fragmented antibody elutes at a fraction that indicates a size less than the native antibody.

In some embodiments, what is meant by "stabilizes" is wherein at least 40% of the antibody is in its main charge form as determined by cation exchange chromatography when the solution containing the antibody and the buffer is kept at about 2-8° C. for up to about 18 months, at about 25° C. for up to about 6 months, or at about 40° C. for up to about 56 days. In some embodiments, what is meant by "stabilizes" is wherein at least 40% of the antibody is in its main charge form as determined by cation exchange chromatography when the solution containing the antibody, or the antigen-binding fragment thereof, and the buffer is kept at about 2-8° C. for up to about 24 months. By "main charge" or "main charge form", what is meant is the fraction of antibody that elutes from an ion exchange resin in the main peak, which is generally flanked by more "basic" peaks on one side and more "acidic" peaks on the other side.

The pharmaceutical formulations of the present invention may have a pH of from about 4.5 to about 7.0. For example, the formulations of the present invention may have a pH of about 4.5; about 4.6; about 4.7; about 4.8; about 4.9; about 5.0; about 5.1; about 5.2; about 5.3; about 5.4; about 5.5; about 5.6; about 5.7; about 5.8; about 5.9; about 6.0; about 6.1; about 6.2; about 6.3; about 6.4; about 6.5; or about 6.6. In some embodiments, the pH is 6.3±0.5; 6.3±0.4; 6.3±0.3; 6.3±0.2; 6.3±0.1; about 6.3; or 6.3.

In some embodiments, the buffer or buffer system comprises at least one buffer that has a buffering range that overlaps fully or in part the range of pH 5.5-7.4, such as, e.g., a buffer having a useful buffering range of pH 4.8 to pH 8.8. In one embodiment, the buffer has a pH of about 6.3. In certain embodiments, the buffer comprises a histidine buffer. In certain embodiments, the histidine is present at a concentration of 5 mM±1 mM to 25 mM±5 mM; 6 mM±1.2 mM to 20 mM±4 mM; 7 mM±1.4 mM to 15 mM±3 mM; 8 mM±1.6 mM to 12 mM±2.4 mM; 9 mM±1.8 mM to 11 mM±2.2 mM; 10 mM±2 mM; about 10 mM; or 10 mM. In certain embodiments, the buffer system comprises phosphate at 10 mM±2 mM, at a pH of 6.3±0.3.

Exemplary Formulations

According to one aspect of the present invention, the liquid pharmaceutical formulation comprises: (i) 60 mg/mL±6 mg/mL of a human antibody that specifically binds to human Activin A (e.g., garetosmab); (ii) a buffer system that buffers at about pH 6.3±0.3; (iii) a thermal stabilizer comprising a sugar and a salt; and (iv) an organic cosolvent.

According to one embodiment, the pharmaceutical formulation comprises: (i) 20±2 mg/mL to 200±20 mg/mL human antibody that specifically binds to human Activin A; (ii) a histidine buffer, which buffers at pH 6.3±0.3; (iii) sucrose and arginine; and (iv) a non-ionic detergent, such as a polysorbate.

According to one embodiment, the pharmaceutical formulation comprises: (i) 50 mg/ml ±5 mg/mL human IgG1 antibody that specifically binds to human Activin A, and which comprises an HCDR1 of SEQ ID NO: 1, an HCDR2 of SEQ ID NO: 2, an HCDR3 of SEQ ID NO: 3, an LCDR1 of SEQ ID NO: 4, an LCDR2 of SEQ ID NO: 5, and an LCDR3 of SEQ ID NO: 6; (ii) 10 mM±2 mM histidine, pH 6.3±0.3; (iii) 5%±1% sucrose; (iv) 70 mM±14 mM arginine; and (v) 0.05%±0.025% polysorbate 20.

According to one embodiment, the pharmaceutical formulation comprises: (i) 60 mg/ml ±6 mg/mL human antibody that specifically binds to human Activin A, and which comprises an HCDR1 of SEQ ID NO: 1, an HCDR2 of SEQ ID NO: 2, an HCDR3 of SEQ ID NO: 3, an LCDR1 of SEQ ID NO: 4, an LCDR2 of SEQ ID NO: 5, and an LCDR3 of SEQ ID NO: 6; (ii) 10 mM±2 mM histidine, pH 6.3±0.3; (iii) 5%±1% sucrose; (iv) 70 mM±14 mM arginine; and (v) 0.05%±0.025% polysorbate 20.

According to one embodiment, the pharmaceutical formulation comprises: (i) 70 mg/ml±7 mg/mL human IgG1 antibody that specifically binds to human Activin A, and which comprises an HCDR1 of SEQ ID NO: 1, an HCDR2 of SEQ ID NO: 2, an HCDR3 of SEQ ID NO: 3, an LCDR1 of SEQ ID NO: 4, an LCDR2 of SEQ ID NO: 5, and an LCDR3 of SEQ ID NO: 6, at a concentration of; (ii) 10 mM±2 mM histidine pH 6.3±0.3; (iii) 5%±1% sucrose; (iv) 70 mM±14 mM arginine; and (iv) 0.05%±0.025% polysorbate 20.

According to one embodiment, the pharmaceutical formulation comprises: (i) 60 mg/ml+6 mg/mL human antibody that specifically binds to human Activin A, and which comprises a heavy chain variable domain of SEQ ID NO: 1, and a light chain variable domain of SEQ ID NO: 5; (ii) 10 mM±2 mM histidine, pH 6.3±0.3; (iii) 5%±1% sucrose; (iv) 70 mM±14 mM arginine; and (v) 0.05%±0.025% polysorbate 20.

Exemplary formulations and primary container closures used during garetosmab preclinical and clinical development are listed in Table.

Additional non-limiting examples of pharmaceutical formulations encompassed by the present invention are set forth elsewhere herein, including the working Examples presented below.

Stability and Robustness of the Pharmaceutical Formulations

The pharmaceutical formulations of the present invention typically exhibit high levels of stability. The term "stable", as used herein in reference to the pharmaceutical formulations, means that the antibodies within the pharmaceutical formulations retain an acceptable degree of physical and/or chemical structure or biological function after storage under defined conditions. A formulation may be stable even though the antibody contained therein does not maintain 100% of its physical and/or chemical structure or biological function after storage for a defined amount of time. Under certain circumstances, maintenance of at least about 90%, 95%, 96%, 97%, 98% or 99% of an antibody's structure or function after storage for a defined amount of time may be regarded as "stable".

Stability can be measured, inter alia, by determining the percentage of native antibody that remains in the formulation after storage for a defined amount of time at a defined temperature and/or relative humidity (RH). The percentage of native antibody can be determined by, inter alia, size exclusion chromatography (e.g., size exclusion ultra performance liquid chromatography [SE-UPLC]), reversed-phase chromatography (e.g., reversed-phase ultra performance liquid chromatography [RP-UPLC]), and/or microchip capillary electrophoresis (e.g., reduced MCE or non-reduced MCE), such that native means non-aggregated and non-fragmented. An "acceptable degree of stability", as that phrase is used herein, means that at least 90% of the native form of the antibody can be detected in the formulation after storage for a defined amount of time at a given temperature. In certain embodiments, at least about 90%, 91%, 92%, 93%, 94%, 95%, 96%, 97%, 98%, 99% or 100% of the native form of the antibody can be detected in the formulation after storage for a defined amount of time at a defined temperature. The defined amount of time after which stability is measured can be at least 7 days, at least 14 days, at least 21 days, at least 28 days, at least 56 days, at least 1 month, at least 2 months, at least 3 months, at least 4 months, at least 5 months, at least 6 months, at least 7 months, at least 8 months, at least 9 months, at least 10 months, at least 11 months, at least 12 months, at least 18 months, at least 24 months, or more. The defined temperature at which the pharmaceutical formulation may be stored when assessing stability can be any temperature from about −80° C. to about

TABLE 1

Garetosmab Drug Product Formulations Tested During Initial Toxicology Studies, Phase 1, and Phase 2 Clinical Studies

|  | Toxicology | Phase 1 | Phase 2/Commercial |
| --- | --- | --- | --- |
| Garetosmab concentration | 50 mg/mL | 50 mg/mL | 60 mg/mL |
| L-histidine | 10 mM | 10 mM | 10 mM |
| pH | 6.3 | 6.3 | 6.3 |
| Sucrose | 5% (w/v) | 5% (w/v) | 5% (w/v) |
| L-arginine HCl | — | — | 70 mM |
| Polysorbate 80 | 0.1% (w/v) | 0.1% (w/v) | — |
| Polysorbate 20 | — | — | 0.05% (w/v) |
| Drug Product Form | Frozen Liquid | Lyophilized | Liquid |
| Primary Container/Closure | Type I Glass vial with FluroTec ® coated chlorobutyl stopper | Type I Glass vial with FluroTec ® coated chlorobutyl stopper | Type I Glass vial with FluroTec ® coated chlorobutyl stopper |

45° C., e.g., storage at about −80° C., about −30° C., about −20° C., about 0° C., about 2°–8° C., about 5° C., about 25° C., about 40° C., or about 45° C. The defined relative humidity (RH) at which the pharmaceutical formulation may be stored when assessing stability can be about 20-90% RH, about 20% RH, about 25% RH, about 30% RH, about 35% RH, about 40% RH, about 45% RH, about 50% RH, about 55% RH, about 60% RH, about 65% RH, about 70% RH, about 75% RH, about 80% RH, about 85% RH, or about 90% RH. Stress conditions may be applied to the pharmaceutical formulation to assess stability, e.g., vortexing, or freezing and thawing. Stress conditions include, for example, vortexing the antibody-organic cosolvent solution for about 30 minutes, 60 minutes or about 120 minutes, or freezing and thawing the antibody-organic cosolvent solution for 4 cycles or 8 cycles. Thermal stress may be applied to the pharmaceutical formulation to assess stability. Thermal stress includes for example holding the formulation for about 14 days, about 28 days or about 56 days at about 25° C., about 35° C., about 37° C., about 40° C. or about 45° C. In certain embodiments, stress may be applied to the pharmaceutical formulation for about 56 days at about 40° C. and about 75% RH.

For example, a pharmaceutical formulation may be deemed stable if after twenty-four months of storage at 2-8° C., at least 90%, 91%, 92%, 93%, 94%, 95%, 96%, 97%, 98%, 98.5%, 99% or 99.5% of antibody, or antigen-binding fragment thereof, detected by SE-UPLC, RP-UPLC or MCE is native (i.e., in the native peak fraction). A pharmaceutical formulation may be deemed stable if after eighteen months of storage at 2-8° C., at least 90%, 91%, 92%, 93%, 94%, 95%, 96%, 97%, 98%, 98.5%, 99% or 99.5% of antibody detected by SE-UPLC, RP-UPLC or MCE is native (i.e., in the native peak fraction). A pharmaceutical formulation may be deemed stable if after six months of storage at 25° C., at least 90%, 91%, 92%, 93%, 94%, 95%, 96%, 97%, 98%, 98.5%, 99% or 99.5% of antibody detected by SE-UPLC, RP-UPLC or MCE is native (i.e., in the native peak fraction). A pharmaceutical formulation may be deemed stable if after six months of storage at 25° C. and at 60% RH, at least 90%, 91%, 92%, 93%, 94%, 95%, 96%, 97%, 98%, 98.5%, 99% or 99.5% of antibody detected by SE-UPLC, RP-UPLC or MCE is native (i.e., in the native peak fraction). A pharmaceutical formulation may also be deemed stable if after six months of storage at 25° C. at least 97%, 97.5%, 98%, 98.5%, 99% or 99.5% of antibody detected by SE-UPLC, RP-UPLC or MCE is native. A pharmaceutical formulation may also be deemed stable if after six months of storage at 25° C. and at 60% RH, at least 97%, 97.5%, 98%, 98.5%, 99% or 99.5% of antibody detected by SE-UPLC, RP-UPLC or MCE is native. A pharmaceutical formulation may be deemed stable if after three months of storage at 25° C., at least 90%, 91%, 92%, 93%, 94%, 95%, 96%, 97%, 98%, 98.5%, 99% or 99.5% of antibody detected by SE-UPLC, RP-UPLC or MCE is native (i.e., in the native peak fraction). A pharmaceutical formulation may be deemed stable if after one month of storage at 25° C., at least 90%, 91%, 92%, 93%, 94%, 95%, 96%, 97%, 98%, 98.5%, 99% or 99.5% of antibody detected by SE-UPLC, RP-UPLC or MCE is native (i.e., in the native peak fraction). A pharmaceutical formulation may also be deemed stable if after 56 days of storage at 40° C., at least 96%, 96.5%, 97%, 97.5%, 98%, 98.5%, 99% or 99.5% of antibody detected by SE-UPLC, RP-UPLC or MCE is native. A pharmaceutical formulation may also be deemed stable if after 56 days of storage at 40° C. and at 75% RH, at least 96%, 96.5%, 97%, 97.5%, 98%, 98.5%, 99% or 99.5% of antibody detected by SE-UPLC, RP-UPLC or MCE is native. A pharmaceutical formulation may also be deemed stable if after 56 days of storage at 40° C. at least 90%, 91%, 92%, 93%, 94%, 95%, 96%, 97%, 98% or 99% of antibody detected by SE-UPLC, RP-UPLC or MCE is native. A pharmaceutical formulation may also be deemed stable if after 56 days of storage at 40° C. and at 75% RH, at least 90%, 91%, 92%, 93%, 94%, 95%, 96%, 97%, 98% or 99% of antibody detected by SE-UPLC, RP-UPLC or MCE is native. A pharmaceutical formulation may also be deemed stable if after six months of storage at −20° C. at least 98.5%, 99% or 99.5% of antibody detected by SE-UPLC, RP-UPLC or MCE is native. A pharmaceutical formulation may also be deemed stable if after 18 months of storage at −30° C. at least 99% or 99.5% of antibody detected by SE-UPLC, RP-UPLC or MCE is native. A pharmaceutical formulation may also be deemed stable if after six months of storage at −80° C. at least 99% or 99.5% of antibody detected by SE-UPLC is native.

Stability can be measured, inter alia, by determining the percentage of antibody that migrates in the main fraction of antibody ("main charge form") during ion exchange, relative to the total combined peak area, wherein stability is proportional to the fraction of antibody in the main charge form. The charge form can be determined by, inter alia, cation exchange chromatography (e.g., cation exchange ultra performance liquid chromatography [CEX-UPLC]), or imaged capillary isoelectric focusing (ICIEF). While not wishing to be bound by theory, deamidation of the antibody may cause the antibody to become more negatively charged and thus more acidic relative to the non-deamidated antibody (see, e.g., Robinson, N., Protein Deamidation, PNAS, Apr. 16, 2002, 99 (8): 5283-5288). An "acceptable degree of stability", as that phrase is used herein, means that at least 30% of the antibody is in a main charge form detected in the formulation after storage for a defined amount of time at a defined temperature. In certain embodiments an acceptable degree of stability means that at least about 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 65%, 70%, 75%, 80%, 85%, 90%, 95%, or 99% of the antibody can be detected in a main charge form after storage for a defined amount of time at a given temperature, or under thermal, freeze/thaw, or agitation stress. The defined amount of time after which stability is measured can be at least 7 days, at least 14 days, at least 28 days, at least 1 month, at least 2 months, at least 3 months, at least 4 months, at least 5 months, at least 6 months, at least 7 months, at least 8 months, at least 9 months, at least 10 months, at least 11 months, at least 12 months, at least 18 months, at least 24 months, or more. The temperature at which the pharmaceutical formulation may be stored when assessing stability can be any temperature from about −80° C. to about 45° C., e.g., storage at about −80° C., about −30° C., about −20° C., about 0° C., about 2°–8° C., about 5° C., about 25° C., about 37° C., about 40° C. or about 45° C. The relative humidity (RH) at which the pharmaceutical formulation may be stored when assessing stability can be about 20-90% RH, about 20% RH, about 25% RH, about 30% RH, about 35% RH, about 40% RH, about 45% RH, about 50% RH, about 55% RH, about 60% RH, about 65% RH, about 70% RH, about 75% RH, about 80% RH, about 85% RH, or about 90% RH. For example, a pharmaceutical formulation may be deemed stable if after 24 months of storage at 2-8° C. no less than about 30%, 35%, 40%, 45%, 50%, 51%, 52%, 53%, 54%, 55%, 56%, 57%, 58%, 59%, 60%, or 61% of the antibody, or antigen-binding fragment thereof, is in a main charge form. A pharmaceutical formulation may be deemed stable if after 18 months of storage at 2-8° C. no less than about 30%, 35%, 40%, 45%, 50%, 51%, 52%, 53%, 54%, 55%, 56%, 57%, 58%, 59%, 60%, or 61% of the antibody is in a main charge form. A pharmaceutical formulation may also be deemed stable if after six months of storage at 25° C. and 60% RH, no less than about 30%, 35%, 40%, 45%, 50%, 51%, 52%, 53%, 54%, 55%, 56%, 57%, 58%, 59%, 60%, or 61% of the antibody is in a main charge form. A pharmaceutical formulation may also be deemed stable if after six months of storage at 25° C., no less than about 45% of the antibody is in a main charge form. A pharmaceutical formulation may also be deemed stable if after 56 days of storage at 40° C. and 75% RH, no less than about 30%, 35%, 40%, 45%, 50%, 51%, 52%, 53%, 54%, 55%, 56%, 57%, 58%, 59%, 60%, or 61% of the antibody is in a main charge form. A pharmaceutical formulation may also be deemed stable if after 56 days of storage at 40° C., no less than about 34% of the antibody can be detected in a main charge form.

Measuring the binding affinity of the antibody to its target may also be used to assess stability or potency. The term "potency" refers to any of the factors that contribute to the utility or biological activity of an antibody to recognize an antigen. Potency can be assayed by ligand-binding assays or functional assays, for example, ELISA, flow cytometry and/or other in vitro cell-based assays. For example, a formulation of the present invention may be regarded as stable if, after storage at e.g., −80° C., −30° C., −20° C., 5° C., 25° C., 37° C., 40° C., 45° C., etc. for a defined amount of time (e.g., 7 days to 24 months), the anti-Activin A antibody contained within the formulation maintains at least 50% and up to about 150% of the potency, measured as binding affinity, of the antibody prior to said storage. Binding affinity may be determined by e.g., ELISA or plasmon resonance. Biological activity may be determined by a Activin A activity assay, such as e.g., by contacting a cell that expresses Activin A with the formulation comprising the anti Activin A antibody. The binding of the antibody to such a cell may be measured directly, such as via FACS analysis. Alternatively, the downstream activity of the Activin A signaling pathway may be measured in the presence of the antibody, and compared to the activity of the Activin A signaling pathway in the absence of antibody. In some embodiments, the Activin A may be endogenous to the cell. In other embodiments, the Activin A may be ectopically (heterologously) expressed in the cell.

Additional methods for assessing the stability of an antibody in formulation are demonstrated in the Examples presented below.

Containers and Methods of Administration

The pharmaceutical formulations of the present invention may be contained within any container suitable for storage or administration of medicines and other therapeutic compositions. For example, the pharmaceutical formulations may be contained within a sealed and sterilized plastic or glass container having a defined volume such as a vial, ampule, syringe, cartridge, bottle, or IV bag. Different types of vials can be used to contain the formulations of the present invention including, e.g., clear and opaque (e.g., amber) glass or plastic vials. Likewise, any type of syringe can be used to contain or administer the pharmaceutical formulations of the present invention.

The pharmaceutical formulations of the present invention may be contained within "normal tungsten" syringes or "low tungsten" syringes. As will be appreciated by persons of ordinary skill in the art, the process of making glass syringes generally involves the use of a hot tungsten rod which functions to pierce the glass thereby creating a hole from which liquids can be drawn and expelled from the syringe. This process results in the deposition of trace amounts of tungsten on the interior surface of the syringe. Subsequent washing and other processing steps can be used to reduce the amount of tungsten in the syringe. As used herein, the term "normal tungsten" means that the syringe contains greater than or equal to 500 parts per billion (ppb) of tungsten. The term "low tungsten" means that the syringe contains less than 500 ppb of tungsten. For example, a low tungsten syringe, according to the present invention, can contain less than about 490, 480, 470, 460, 450, 440, 430, 420, 410, 390, 350, 300, 250, 200, 150, 100, 90, 80, 70, 60, 50, 40, 30, 20, 10 or fewer ppb of tungsten.

The rubber plungers used in syringes, and the rubber stoppers used to close the openings of vials, may be coated to prevent contamination of the medicinal contents of the syringe or vial, or to preserve their stability. Thus, pharmaceutical formulations of the present invention, according to certain embodiments, may be contained within a syringe that comprises a coated plunger, or within a vial that is sealed with a coated rubber stopper. For example, the plunger or stopper may be coated with a fluorocarbon film. Examples of coated stoppers or plungers suitable for use with vials and syringes containing the pharmaceutical formulations of the present invention are mentioned in, e.g., U.S. Pat. Nos. 4,997,423; 5,908,686; 6,286,699; 6,645,635; and 7,226,554, the contents of which are incorporated by reference herein in their entireties. Particular exemplary coated rubber stoppers and plungers that can be used in the context of the present invention are commercially available under the tradename "FluroTec®", available from West Pharmaceutical Services, Inc. (Lionville, PA). FluroTec® is an example of a fluorocarbon coating used to minimize or prevent drug product from adhering to the rubber surfaces.

According to certain embodiments of the present invention, the pharmaceutical formulations may be contained within a low tungsten syringe that comprises a fluorocarbon-coated plunger.

The pharmaceutical formulations can be administered to a patient by parenteral routes such as injection (e.g., subcutaneous, intravenous, intramuscular, intraperitoneal, etc.) or percutaneous, mucosal, nasal, pulmonary or oral administration. Numerous reusable pen or autoinjector delivery devices can be used to subcutaneously deliver the pharmaceutical formulations of the present invention. Examples include, but are not limited to AUTOPEN® delivery pen (Owen Mumford, Inc., Woodstock, UK), DISETRONIC™ delivery pen (Disetronic Medical Systems, Bergdorf, Switzerland), HUMALOG MIX 75/25™ delivery pen, HUMALOG™ delivery pen, HUMALIN 70/30™ delivery pen (Eli Lilly and Co., Indianapolis, IN), NOVOPEN™ I, II and III delivery device (Novo Nordisk, Copenhagen, Denmark), NOVOPEN JUNIOR™ delivery device (Novo Nordisk, Copenhagen, Denmark), BD™ delivery pen (Becton Dickinson, Franklin Lakes, NJ), OPTIPEN™ delivery device, OPTIPEN PRO™ delivery device, OPTIPEN STARLET™ delivery device, and OPTICLIK™ delivery device (sanofi-aventis, Frankfurt, Germany). Examples of disposable pen or autoinjector delivery devices having applications in subcutaneous delivery of a pharmaceutical composition of the present invention include, but are not limited to the SOLOSTAR™ delivery pen (sanofi-aventis), the FLEXPEN™ delivery device (Novo Nordisk), the KWIKPEN™ delivery device (Eli Lilly), the SURECLICK™ Autoinjector (Amgen, Thousand Oaks, CA), the PENLET™ delivery device (Haselmeier, Stuttgart, Germany), the EPIPEN® delivery device (Dey, L.P.), and the HUMIRA™ delivery pen (Abbott Labs, Abbott Park, IL).

The use of a microinfusor to deliver the pharmaceutical formulations of the present invention is also contemplated herein. As used herein, the term "microinfusor" means a subcutaneous delivery device designed to slowly administer large volumes (e.g., up to about 2.5 mL or more) of a therapeutic formulation over a prolonged period of time (e.g., about 10, 15, 20, 25, 30 or more minutes). See, e.g., U.S. Pat. Nos. 6,629,949; 6,659,982; and Mechan et al., *J. Controlled Release* 46:107-116 (1996). Microinfusors are particularly useful for the delivery of large doses of therapeutic proteins contained within high concentration (e.g., about 100, 125, 150, 175, 200 or more mg/mL) or viscous solutions.

In one embodiment, the pharmaceutical formulation is administered via an IV drip, such that the formulation is diluted in an IV bag containing a physiologically acceptable solution. In one embodiment, the pharmaceutical composition is a compounded sterile preparation in an intravenous infusion bag, such that a single dose of drug product is diluted into 100 mL, 250 mL (or other like amount suitable for intravenous drip delivery) of a physiological buffer (e.g., 0.9% saline). In some embodiments, the infusion bag is made of a polyvinyl chloride (e.g., VIAFLEX, Baxter, Deerfield, Illinois). In some embodiments, the infusion bag is made of a polyolefin (EXCEL IV Bags, Braun Medical Inc., Bethlehem, Pennsylvania).

Therapeutic Uses of the Pharmaceutical Formulations

The pharmaceutical formulations of the present invention are useful, inter alia, for the treatment, prevention or amelioration of any disease or disorder associated with Activin A activity, including diseases or disorders mediated by Activin A. Exemplary, non-limiting diseases and disorders that can be treated or prevented by the administration of the pharmaceutical formulations of the present invention include Fibrodysplasia ossificans progressiva (FOP). FOP is a rare heritable disorder in which heterotopic ossification forms histologically and biomechanically 'normal' bone at extraskeletal sites, such as connective tissue. This disorder, although episodic, is cumulative, and results in permanent disability of increasing severity. FOP is a relentless, progressive, ultra-rare genetic disorder in which muscles, tendons and ligaments are progressively replaced by bone, a process known Heterotopic Ossification (HO). HO of the jaw, spine and rib cage can make it difficult to speak, eat or breathe, leading to weight loss and escalating loss of mobility and skeletal deformity. People with FOP also experience episodic, localized inflammation known as a "flare-ups" though HO may occur both silently as well as in association with symptoms. Most people with FOP are wheelchair bound by 30 years old and the median age of survival is approximately 40 years. Death often results from complications, such as pneumonia, heart failure and aspiration, stemming from HO and loss of mobility in the chest, neck and jaw.

Examples

The following examples are presented so as to provide those of ordinary skill in the art with a complete disclosure and description of how to make and use the methods and compositions of the invention, and are not intended to limit the scope of what the inventors regard as their invention. Efforts have been made to ensure accuracy with respect to numbers used (e.g., amounts, temperature, etc.) but some experimental errors and deviations should be accounted for. Unless indicated otherwise, parts are parts by mole, molecular weight is average molecular weight, percent concentration (%) means the mass of the solute in grams divided by the volume of the solution in milliliters times 100% (e.g., 10% sucrose means 0.1 gram of sucrose per milliliter of solution), temperature is in degrees Centigrade, and pressure is at or near atmospheric pressure. Initial formulation development activities involved screening organic cosolvents, thermal stabilizers, and buffers in liquid and lyophilized formulations of anti-Activin A antibodies to identify excipients that are compatible with the protein and enhance its stability, while maintaining near physiologic osmolality and low viscosity for intravenous and subcutaneous injection. Buffer conditions were also examined to determine the optimal pH for maximum protein stability.

Example 1: Exemplary Anti-Activin A Antibody Formulation

For First in Human (FIH) studies, a lyophilized drug product (DP) was developed intended to be used for both intravenous (IV) and subcutaneous (SC) administration. The formulation for FIH was developed by assessing the effects of different components of the formulation on the stability of an anti-Activin A antibody, for example, garetosmab. These components included pH, buffer, thermal stabilizers, and surfactants. The major degradation pathways for garetosmab are formation of high and low molecular weight species, and acidic charge variants. Analytical methods were developed to monitor these degradation products. In addition, general quality attributes were monitored. These included protein concentration, pH, solubility, and biological potency. Based on the formulation development studies executed, a lyophilized formulation was developed which included histidine at pH 6.3, sucrose and polysorbate 80. The lyophilized formulation developed for FIH was stable for at least 36 months.

Garetosmab was delivered by IV and SC administration in a Phase 1 clinical study. A single, dual-use lyophilized formulation was developed such that lyophilized garetosmab DP was reconstituted with sterile water for injection (WFI) to a concentration of either 50 mg/mL garetosmab for IV infusion, or 150 mg/mL garetosmab for SC injection. Formulation development activities involved assessment of buffers, pH, organic co-solvents, surfactants, and sucrose (as the thermal stabilizer) to identify excipients that optimize protein stability. Garetosmab DP was produced by lyophilization of an optimized, aqueous buffered formulation containing 10 mM histidine, pH 6.3, 0.1% (w/v) polysorbate 80, 5% (w/v) sucrose, and 50 mg/mL garetosmab. Table lists the composition of garetosmab DP after reconstitution with different volumes of WFI for IV or SC administration.

TABLE 2

Composition of Garetosmab DP for First in Human Studies After Reconstitution with Different Volumes of WFI for IV or SC Administration

| Formulation Component | Reconstituted for IV Administration | Reconstituted for SC Administration |
| --- | --- | --- |
| Garetosmab | 50 mg/mL | 150 mg/mL |
| Histidine | 10 mM | 30 mM |

TABLE 2-continued

Composition of Garetosmab DP for First in Human Studies After
Reconstitution with Different Volumes of WFI for IV or SC Administration

| Formulation Component | Reconstituted for IV Administration | Reconstituted for SC Administration |
|---|---|---|
| Sucrose | 5% | 15% |
| Polysorbate 80 | 0.1% | 0.3% |
| pH | 6.3 | 6.3 |

DP, drug product;
IV, intravenous;
SC, subcutaneous;
WFI, Water for Injection

The effect of buffer and pH on the thermal stability of garetosmab was initially examined in liquid formulations by incubating 5 mg/mL garetosmab at 45° C. for 28 days in a series of buffer systems at varying pH ranges. Maximum protein stability was observed when garetosmab was formulated between pH 5.5 and 6.5 in 10 mM histidine buffer (Table). The effect of pH on the thermal stability of garetosmab was further examined in liquid formulations in histidine buffers ranging in pH from 6.0 to 6.6. A pH of 6.3 was selected for the DP formulation because the formation of high molecular weight (HMW) species was minimal at this pH (Table). This target pH would also permit a suitable pH range for maximal stability that could be achieved in a large-scale manufacturing setting. Based on these results, 10 mM histidine buffer at pH 6.3 was selected for the garetosmab DP formulation.

The effect of surfactants and organic co-solvents on the agitation stress stability, freeze/thaw stability, and thermal stability of 10 mg/mL garetosmab was examined in liquid formulations. The results of these studies are summarized in Table through Table. Garetosmab was unstable when agitated in the absence of an organic co-solvent or surfactant. All the organic co-solvents and surfactants that were tested protected garetosmab from agitation-induced instability (Table). 10 mg/mL garetosmab was unstable when exposed to multiple freeze/thaw cycles in the absence of an organic co-solvent or surfactant (Table). All the organic co-solvents and surfactants that were tested protected garetosmab from freeze/thaw-induced instability (Table). In a subsequent study, which exposed 70 mg/mL garctosmab to eight freezing and thawing cycles, no visual failures or increases in HMW species were observed, even in solutions which did not contain surfactant or co-solvent (Table). 70 mg/mL is representative of the concentrations of garetosmab that were subjected to freezing and thawing in a manufacturing setting during clinical trials of garetosmab. Polysorbate 80 was selected as the surfactant for the initial garetosmab DP formulation because it stabilized the protein to agitation stress and freeze/thaw-induced instability and had a minimal adverse impact on the thermal stability, while demonstrating a safe history of use in monoclonal antibody formulations (Table through Table).

The stabilizing effect of sucrose on garetosmab was assessed. 10 mg/mL garetosmab in a liquid formulation exhibited improved stability when formulated with 5% sucrose, compared to no sucrose present, and incubated under accelerated conditions (Table). Garetosmab was sufficiently stable for initial clinical use when formulated in the presence of histidine, polysorbate 80, and sucrose, at pH 6.3.

Based on the initial formulation development studies, the following formulation was selected for clinical use: 50 mg/mL garetosmab, 10 mM histidine, pH 6.3, 5% (w/v) sucrose, and 0.1% (w/v) polysorbate 80. The DP was produced by filling 5.74 mL of this formulation into 20 mL glass vials and lyophilized. Research stability studies indicated that this formulation was stable for 36 months (Table 9).

TABLE 3

Effect of Buffer and pH on the Stability of 5 mg/mL Garetosmab Incubated at 45° C. for 28 Days Formulation 5 mg/mL garetosmab, 10 mM buffer
Fill Volume 0.4 mL
Container/Closure 2 mL Type 1 borosilicate glass vial with a FluroTec ®-coated 4432/50 butyl rubber stopper

| pH/Buffer | FDG Lot Number | Color and Appearance | Turbidity (Increase in OD at 405 nm) | % Total Protein Recovered by RP-UPLC | Change in Purity by SE-UPLC[a] | | | Change in Charge Variants by CEX-UPLC[a] | | |
|---|---|---|---|---|---|---|---|---|---|---|
| | | | | | % HMW | % Native | % LMW | % Acidic | % Main | % Basic |
| pH 4.5, Acetate | L13-322 | Pass | 0.00 | 102 | 2.5 | −4.3 | 1.9 | −5.4 | −16.4 | 21.8 |
| pH 5.0, Acetate | L13-323 | Pass | 0.00 | 96 | 1.6 | −3.2 | 1.6 | −0.9 | −14.6 | 15.5 |
| pH 5.5, Acetate | L13-324 | Pass | 0.00 | 106 | 1.4 | −1.9 | 0.5 | 11.0 | −11.3 | 0.4 |
| pH 5.5, Histidine | L13-325 | Pass | 0.00 | 92 | 1.2 | −2.2 | 1.0 | 3.6 | −7.9 | 4.3 |
| pH 6.0, Histidine | L13-326 | Pass | 0.01 | 100 | 0.8 | −1.8 | 1.0 | 8.7 | −11.6 | 2.9 |
| pH 6.5, Histidine | L13-327 | Pass | 0.00 | 97 | 1.0 | −1.3 | 0.3 | 17.2 | −16.7 | −0.5 |
| pH 6.5, Phosphate | L13-328 | Pass | 0.00 | 95 | 2.5 | −2.9 | 0.3 | 20.3 | −17.2 | −3.0 |
| pH 7.0, Phosphate | L13-329 | Pass | 0.00 | 94 | 2.9 | −3.6 | 0.7 | 36.2 | −31.4 | −4.8 |

[a]Reported as a change in purity relative to the starting material; The starting material (no incubation) contains ≥98.5% native peak by SE-UPLC and ≥55.8% main peak by CEX-UPLC in all formulations.
CEX, cation exchange;
DS, drug substance;
FDG, Formulation Development group;
HMW, high molecular weight;
LMW, low molecular weight;
OD, optical density;
RP, reversed-phase;
SE, size exclusion;
UPLC, ultra performance liquid chromatography

TABLE 4

Effect of Buffer and pH on the Stability of 25 mg/mL Garetosmab Incubated at 45° C. for 28 Days Formulation 25 mg/mL garetosmab, 10 mM buffer
Fill Volume 0.5 mL
Container/Closure 2 mL Type 1 borosilicate glass vial with a FluroTec ®-coated 4432/50 butyl rubber stopper

| pH/Buffer | FDG Lot Number | Color and Appearance | Turbidity (Increase in OD at 405 nm) | % Total Protein Recovered by RP-UPLC | Change in Purity by SE-UPLC[a] | | | Change in Charge Variants by CEX-UPLC[a] | | |
|---|---|---|---|---|---|---|---|---|---|---|
| | | | | | % HMW | % Native | % LMW | % Acidic | % Main | % Basic |
| pH 6.0, Histidine | L13-1003 | Pass | 0.01 | 95 | 2.3 | −6.2 | 3.7 | 3.8 | −11.0 | 7.2 |
| pH 6.1, Histidine | L13-1004 | Pass | 0.00 | 99 | 1.5 | −3.6 | 2.0 | 6.2 | −12.8 | 6.6 |
| pH 6.2, Histidine | L13-1005 | Pass | 0.00 | 97 | 1.2 | −2.7 | 1.4 | 8.8 | −14.1 | 5.3 |
| pH 6.3, Histidine | L13-1006 | Pass | 0.00 | 100 | 1.4 | −2.4 | 1.0 | 10.6 | −14.6 | 4.0 |
| pH 6.4, Histidine | L13-1007 | Pass | 0.00 | 100 | 1.4 | −2.1 | 0.7 | 12.1 | −14.7 | 2.6 |
| pH 6.5, Histidine | L13-1008 | Pass | 0.01 | 100 | 1.5 | −2.2 | 0.6 | 13.2 | −15.6 | 2.5 |
| pH 6.6, Histidine | L13-1009 | Pass | 0.01 | 99 | 1.8 | −2.0 | 0.2 | 15.2 | −18.1 | 2.9 |

[a]Reported as a change in purity relative to the starting material; The starting material (no incubation) contains ≥98.6% native peak by SE-UPLC and ≥64.7% main peak by CEX-UPLC in all formulations.
CEX, cation exchange;
DS, drug substance;
FDG, Formulation Development group;
HMW, high molecular weight;
LMW, low molecular weight;
OD, optical density;
RP, reversed-phase;
SE, size exclusion;
UPLC, ultra performance liquid chromatography

TABLE 5

Effect of Organic Co-solvents and Surfactants on the Stability of 10 mg/mL Garetosmab After Agitation (120 Minutes of Vortexing)

Formulation 10 mg/mL garetosmab, 10 mM histidine, pH 6.0
Fill Volume 0.4 mL
Container/Closure 2 mL Type 1 borosilicate glass vial with a FluorTec ®-coated 4432/50 butyl rubber stopper

| Co-Solvent/Surfactant | FDG Lot Number | Color and Appearance | Turbidity (Increase in OD at 405 nm) | pH | % Total Protein Recovered by RP-UPLC | Change in Purity by SE-UPLC[a] | | | Change in Charge Variants by CEX-UPLC[a] | | |
|---|---|---|---|---|---|---|---|---|---|---|---|
| | | | | | | % HMW | % Native | % LMW | % Acidic | % Main | % Basic |
| No Co-Solvent/Surfactant | L13-468 | Pass | 0.13 | 6.1 | 101 | 0.5 | −0.5 | −0.1 | −0.4 | 0.3 | 0.1 |
| 5% (w/v) Sucrose | L13-469 | Pass | 0.16 | 6.1 | 98 | 0.8 | −0.8 | 0.0 | −0.4 | 0.3 | 0.1 |
| 0.1% (w/v) Polysorbate 20, 5% Sucrose | L13-470 | Pass | 0.00 | 6.1 | 100 | −0.1 | 0.1 | 0.0 | −0.1 | 0.2 | −0.1 |
| 0.1% (w/v) Polysorbate 80, 5% Sucrose | L13-471 | Pass | 0.00 | 6.1 | 100 | 0.0 | 0.0 | 0.0 | −0.2 | 0.2 | 0.0 |
| 0.5% (w/v) PEG3350, 5% Sucrose | L13-472 | Pass | 0.00 | 6.1 | 100 | 0.0 | 0.1 | 0.0 | −0.2 | 0.8 | −0.6 |
| 1.5% (w/v) PEG3350, 5% Sucrose | L13-473 | Pass | 0.00 | 6.1 | 100 | 0.0 | 0.1 | 0.0 | −0.2 | 0.3 | −0.1 |

[a]Reported as a change in purity relative to the starting material; The starting material (no incubation) contains ≥98.8% native peak by SE-UPLC and ≥55.5% main peak by CEX-UPLC in all five formulations.
CEX, cation exchange;
DS, drug substance;
FDG, Formulation Development group;
HMW, high molecular weight;
LMW, low molecular weight;
OD, optical density;
RP, reversed-phase;
SE, size exclusion;
UPLC, ultra performance liquid chromatography

TABLE 6

Effect of Organic Co-Solvents and Surfactants on the
Stability of 10 mg/mL Garetosmab After Eight Freezing and Thawing Cycles Formulation 10 mg/mL garetosmab, 10 mM histidine, pH 6.0
Fill Volume 0.4 mL
Container/Closure 2 mL Type 1 borosilicate glass vial with a FluorTec ®-coated 4432/50 butyl rubber stopper

| Co-Solvent/Surfactant | FDG Lot Number | Color and Appearance | Turbidity (Increase in OD at 405 nm) | pH | % Total Protein Recovered by RP-UPLC | Change in Purity by SE-UPLC$^a$ | | | Change in Charge Variants by CEX-UPLC$^a$ | | |
|---|---|---|---|---|---|---|---|---|---|---|---|
| | | | | | | % HMW | % Native | % LMW | % Acidic | % Main | % Basic |
| No Co-Solvent/Surfactant | L13-468 | Fail | 0.47 | 6.1 | 107 | 0.0$^b$ | 0.0$^b$ | 0.0$^b$ | −0.1 | 0.1 | 0.0 |
| 5% (w/v) Sucrose | L13-469 | Fail | 0.40 | 6.1 | 97 | 1.0 | −1.0 | 0.0 | −0.1 | 0.1 | 0.0 |
| 0.1% (w/v) Polysorbate 20, 5% Sucrose | L13-470 | Pass | 0.00 | 6.1 | 102 | −0.1 | 0.1 | 0.0 | 0.0 | 0.1 | −0.1 |
| 0.1% (w/v) Polysorbate 80, 5% Sucrose | L13-471 | Pass | 0.00 | 6.1 | 102 | 0.0 | 0.0 | 0.0 | 0.0 | 0.5 | −0.5 |
| 0.5% (w/v) PEG3350, 5% Sucrose | L13-472 | Pass | 0.00 | 6.1 | 105 | −0.1 | 0.2 | −0.1 | −0.1 | 0.3 | −0.1 |
| 1.5% (w/v) PEG3350, 5% Sucrose | L13-473 | Pass | 0.00 | 6.1 | 104 | −0.1 | 0.2 | −0.1 | 0.2 | −0.4 | 0.2 |

$^a$Reported as a change in purity relative to the starting material; The starting material (no incubation) contains ≥98.8% native peak by SE-UPLC and ≥55.5% main peak by CEX-UPLC in all five formulations.
$^b$Values for four freeze/thaw cycles are:
☐HMW = 0.5%,
☐Native = −0.4%, and
☐LMW = 0.0%
CEX, cation exchange;
DS, drug substance;
FDG, Formulation Development group;
HMW, high molecular weight;
LMW, low molecular weight;
OD, optical density;
RP, reversed-phase;
SE, size exclusion;
UPLC, ultra performance liquid chromatography

TABLE 7

Effect of Organic Co-Solvents and Surfactants on the
Stability of 70 mg/mL Garetosmab after Eight Freezing and Thawing Cycles Formulation 70 mg/mL garetosmab, 10 mM histidine, pH 6.0
Fill Volume 0.4 mL
Container/Closure 2 mL Type 1 borosilicate glass vial with a FluorTec ®-coated 4432/50 butyl rubber stopper

| Co-Solvent/Surfactant | FDG Lot Number | Color and Appearance | Turbidity (Increase in OD at 405 nm) | pH | % Total Protein Recovered by RP-UPLC | Change in Purity by SE-UPLC$^a$ | | | Change in Charge Variants by CEX-UPLC$^a$ | | |
|---|---|---|---|---|---|---|---|---|---|---|---|
| | | | | | | % HMW | % Native | % LMW | % Acidic | % Main | % Basic |
| No Co-Solvent/Surfactant | L13-595 | Pass | 0.03 | 6.1 | 102 | 0.0 | −0.1 | 0.1 | −0.2 | 0.1 | 0.1 |
| 5% (w/v) Sucrose | L13-596 | Pass | 0.02 | 6.1 | 100 | −0.1 | −0.1 | 0.2 | −0.3 | 0.3 | 0.0 |
| 0.1% (w/v) Polysorbate 80, 5% Sucrose | L13-597 | Pass | 0.01 | 6.1 | 102 | −0.1 | 0.0 | 0.1 | −0.3 | 0.3 | 0.0 |

TABLE 7-continued

Effect of Organic Co-Solvents and Surfactants on the
Stability of 70 mg/mL Garetosmab after Eight Freezing and Thawing Cycles

| 0.5% (w/v) PEG3350, 5% Sucrose | L13-598 | Pass | 0.01 | 6.1 | 99 | −0.1 | 0.0 | 0.1 | −0.4 | 0.4 | −0.1 |

[a]Reported as a change in purity relative to the starting material; The starting material (no incubation) contains ≥98.6% native peak by SE-UPLC and ≥56.3% main peak by CEX-UPLC in all five formulations.
CEX, cation exchange;
DS, drug substance;
FDG, Formulation Development group;
HMW, high molecular weight;
LMW, low molecular weight;
OD, optical density;
RP, reversed-phase;
SE, size exclusion;
UPLC, ultra performance liquid chromatography

TABLE 8

Effect of Organic Co-Solvents and Surfactants on the
Stability of 10 mg/mL Garetosmab Incubated at 45° C. for 28 Days Formulation 10 mg/mL garetosmab, 10 mM histidine, pH 6.0
Fill Volume 0.4 mL
Container/Closure 2 mL Type 1 borosilicate glass vial with a FluorTec ®-coated 4432/50 butyl rubber stopper

| Co-Solvent/ Surfactant | FDG Lot Number | Color and Appearance | Turbidity (Increase in OD at 405 nm) | pH | % Total Protein Recovered by RP-UPLC | Change in Purity by SE-UPLC[a] | | | Change in Charge Variants by CEX-UPLC[a] | | |
|---|---|---|---|---|---|---|---|---|---|---|---|
| | | | | | | % HMW | % Native | % LMW | % Acidic | % Main | % Basic |
| No Co-Solvent/ Surfactant | L13-468 | Pass | 0.00 | 6.2 | 98 | 0.9 | −3.2 | 2.4 | 9.1 | −12.5 | 3.5 |
| 5% (w/v) Sucrose | L13-469 | Pass | 0.00 | 6.1 | 101 | 0.6 | −2.7 | 2.0 | 10.2 | −13.0 | 2.8 |
| 0.1% (w/v) Polysorbate 20, 5% Sucrose | L13-470 | Pass | 0.01 | 6.0 | 101 | 6.1 | −8.1 | 2.1 | 12.1 | −22.2 | 10.1 |
| 0.1% (w/v) Polysorbate 80, 5% Sucrose | L13-471 | Pass | 0.01 | 6.1 | 101 | 4.2 | −6.6 | 2.3 | 13.2 | −24.5 | 11.3 |
| 0.5% (w/v) PEG3350, 5% sucrose | L13-472 | Pass | 0.01 | 6.1 | 101 | 1.2 | −3.1 | 2.0 | 14.1 | −17.4 | 3.3 |
| 1.5% (w/v) PEG3350, 5% Sucrose | L13-473 | Pass | 0.02 | 6.0 | 103 | 5.7 | −8.1 | 2.4 | 14.9 | −28.4 | 13.5 |

[a]Reported as a change in purity relative to the starting material; The starting material (no incubation) contains ≥98.8% native peak by SE-UPLC and ≥55.5% main peak by CEX-UPLC in all five formulations.
CEX, cation exchange;
DS, drug substance;
FDG, Formulation Development group;
HMW, high molecular weight;
LMW, low molecular weight;
OD, optical density;
RP, reversed-phase;
SE, size exclusion;
UPLC, ultra performance liquid chromatography

TABLE 9

Development Stability of
Garetosmab Lyophilized C1P2 Drug Product Stored at 5° C.

Pre-lyophilized Formulation: 50 mg/mL garetosmab, 10 mM histidine, pH 6.3, 5% (w/v) sucrose, 0.1% (w/v) polysorbate 80
Fill Volume: 5.3 mL
Container/Closure: 20 mL Type 1 borosilicate glass vials with a West V10-F597W 4432/50 GRY B2-TR stopper

| Assay | | 0 | 1 | 3 | 6 | 9 | 12 | 18 | 24 | 36 |
|---|---|---|---|---|---|---|---|---|---|---|
| Analysis of Lyophilized Drug Product | | | | | | | | | | |
| Cake Appearance | | Pass | Pass | Pass | Pass | Pass | Pass | Pass | Pass | Pass |
| % Moisture | | 0.13 | NR | NR | 0.18 | NR | 0.19 | NR | 0.25 | 0.29 |
| Reconstitution Time (seconds) | | 60 | 60 | 60 | 90 | 70 | 60 | 60 | 60 | 120 |
| Analysis of Reconstituted Drug Product[a] | | | | | | | | | | |
| Color and Appearance | | Pass | Pass | Pass | Pass | Pass | Pass | Pass | Pass | Pass |
| Turbidity (Increase in OD at 405 nm) | | 0.00 | 0.01 | 0.00 | 0.00 | 0.00 | 0.00 | 0.00 | 0.00 | 0.00 |
| pH | | 6.4 | 6.3 | 6.3 | 6.3 | 6.3 | 6.3 | 6.3 | 6.3 | 6.3 |
| Particulate Analysis by MFI | 2 to 10 µm | 1168 | NR | NR | 2744 | NR | 1122 | NR | 1941 | 6357 |
| | ≥10 µm | 15 | NR | NR | 48 | NR | 17 | NR | 6 | 121 |
| | ≥25 µm | 7 | NR | NR | 10 | NR | 4 | NR | 0 | 7 |
| % Total Protein Recovered by RP-UPLC | | 100 | 94 | 96 | 93 | 94 | 95 | 95 | 96 | 94 |
| Purity by MCE-SDS | Non-reduced; % main peak | 100 | NR | NR | 100 | NR | 100 | NR | 100 | 100 |
| | Reduced; % heavy + light chain | 100 | NR | NR | 100 | NR | 100 | NR | 100 | 100 |
| Purity by SE-UPLC | % HMW | 0.8 | 0.8 | 0.8 | 0.9 | 0.9 | 0.9 | 0.9 | 1.0 | 1.2 |
| | % Native | 98.7 | 98.8 | 98.6 | 98.5 | 98.5 | 98.5 | 98.5 | 98.3 | 97.8 |
| | % LMW | 0.5 | 0.4 | 0.6 | 0.6 | 0.6 | 0.6 | 0.6 | 0.7 | 1.1 |
| Charge Variant Analysis by CEX-UPLC | % Acidic | 31.4 | 31.6 | 30.7 | 31.4 | 31.5 | 31.7 | 32.7 | 32.0 | 32.2 |
| | % Main | 53.4 | 52.5 | 51.3 | 52.3 | 51.6 | 52.7 | 50.2 | 51.6 | 52.4 |
| | % Basic | 15.1 | 15.9 | 18.0 | 16.3 | 17.0 | 15.6 | 17.1 | 16.4 | 15.4 |
| Charge Variant Analysis by iCIEF | % Acidic | 48.4 | NR | NR | 44.6 | NR | 48.5 | NR | 49.8 | 49.0 |
| | % Main | 48.4 | NR | NR | 51.5 | NR | 46.3 | NR | 43.6 | 45.7 |
| | % Basic | 3.2 | NR | NR | 3.9 | NR | 5.1 | NR | 6.6 | 5.3 |
| % Relative Potency by Bioassay | | 103 | NR | NR | 114 | NR | 135 | NR | 106 | 95 |

[a]Samples were reconstituted with sterile Water for Injection to 100 mg/mL garetosmab.
C1P2, cell line 1 process 2;
CEX, cation exchange;
DS, drug substance;
FDG, Formulation Development group;
HMW, high molecular weight;
iCIEF, imaged capillary isoelectric focusing;
LMW, low molecular weight;
MCE-SDS, microchip capillary electrophoresis-sodium dodecyl sulfate;
MFI, Micro-Flow Imaging ™;
NR, not required;
OD, optical density;
RP, reversed-phase;
SE, size exclusion;
UPLC, ultra performance liquid chromatography.

Example 2: Exemplary Anti-Activin A Antibody Formulations

The objective of the drug product (DP) commercial development activities were to develop an anti-Activin A antibody (e.g., garetosmab) DP with the following attributes: a liquid formulation in glass vials with a concentration of garetosmab sufficient to deliver a dose of 10 mg/kg garctosmab by intravenous (IV) infusion; the vial of garctosmab should contain 300 mg in 5 mL; a near iso-osmolar formulation that can be diluted for IV infusion with commonly available diluents; a formulation that is compatible with and stable in type 1 clear glass vials and standard serum stopper as the primary packaging system; a sterile DP that supports long-term stability with a shelf-life of 24 months or longer at 2-8° C.; a robust formulation that minimizes formation of garetosmab high molecular weight (HMW) species, minimizes changes in the relative distribution of garetosmab charge variant species, minimizes the presence of visible and subvisible particles, and maintains the biological activity when subjected to handling and thermal stresses; and a formulation that will stabilize high garetosmab concentrations and have characteristics that are acceptable for use in subcutaneous (SC) administration.

This study describes the late phase formulation optimization, garctosmab commercial formulation confirmation, and garetosmab robustness. The garetosmab commercial formulation is a liquid containing 60 mg/mL garctosmab in an aqueous solution containing 10 mM L-histidine, pH 6.3, 5% (w/v) sucrose, 70 mM L-arginine HCl, and 0.05% (w/v)

polysorbate 20. This formulation stabilizes garetosmab during long-term storage at 2-8° C. and when exposed to accelerated and stress conditions, including agitation, freezing and thawing, and thermal stress. For Phase 2 clinical studies and commercialization, a liquid DP formulation suitable for IV administration was developed. This formulation was built upon knowledge gained during initial development, plus additional formulation development studies performed to refine and optimize the formulation for the specific clinical indication and to optimize product stability. The formulation for garetosmab consists of the following: 60 mg/mL garetosmab, 10 mM histidine, pH 6.3, 5% sucrose, 70 mM arginine-HCl, and 0.05% polysorbate 20. The DP is manufactured by filling 5.61 mL into a 10 mL glass vial and sealed with an elastomeric stopper. Long-term stability studies have been initiated and indicate that the formulation is stable for at least 12 months. The stability studies will continue for 60 months. Robustness studies have been initiated. Long-term, accelerated and stress stability studies thus far indicate that the formulation is robust with respect to pH, protein concentration and excipient concentration. Small variations that might occur in the manufacturing process have no meaningful impact to the quality of garctosmab DP.

The pharmaceutical development studies executed during the garetosmab development process resulted in a stable formulation for garetosmab that meets the goals set forth to address the clinical and commercial needs. The goal for late-stage clinical development was to produce a formulation that would deliver 300 mg of garetosmab in 5 mL of solution. A secondary goal was to have a formulation that would be easily converted to a subcutaneous formulation for future use. Formulation development studies were conducted with the goal of developing a liquid formulation containing 60 mg/mL garetosmab that will be used for IV administration. Formulation development activities for the liquid formulation involved assessment of histidine buffer concentration, surfactant concentration, and other stabilizers.

Selection of Buffer and pH for the Garetosmab Liquid Formulation

Initial FIH development activities determined that the optimal pH for garetosmab was 6.3. The pH remained unchanged throughout development. Histidine buffer was utilized for the lyophilized formulation for initial Phase 1 studies of garetosmab based upon a buffer screening study. The same buffer was chosen for late stage formulation development. The stability of 50 mg/mL garetosmab was tested when incubated at 45° C. for 28 days at pH 6.3 when the histidine concentration was 5 mM, 10 mM or 25 mM to assess the optimal histidine concentration. The results of this stress test indicate that 10 mM histidine at pH 6.3 falls in a stable region of the design space with sufficient space on either end to tolerate small variations in the buffer concentration (Table) or pH (Table). Based on these results the same buffer composition and pH used for the lyophilized formulation, histidine, at a concentration of 10 mM and a pH of 6.3, was selected as the buffer, buffer concentration, and pH for the late stage liquid formulation.

Selection of Thermal Stabilizers for the Garetosmab Liquid Formulation

Initial development studies for garetosmab demonstrated that 5% (w/v) sucrose was required to stabilize garetosmab to freeze-thaw stress. Therefore, 5% (w/v) sucrose was added to the bulk Drug Substance (DS) because it adequately stabilizes the bulk DS against the formation of HMW species when subjected to freezing and thawing cycles that the DS would be exposed to during manufacturing (freezing and thawing stability for DS is discussed in Module S.7.1). A study was performed to assess the stability of 50 mg/mL liquid garetosmab when incubated at 45° C. for 28 days or subjected to 8 cycles of freezing and thawing, when the sucrose concentration in the formulation was varied between 0 and 10%. The results of these stress tests indicate that 5% sucrose falls in a stable region of the design space with sufficient space on either end to tolerate small variations in the sucrose concentration that may be experienced as a result of normal manufacturing variability (Table and Table). 5% sucrose was chosen as a stabilizer because it sufficiently stabilizes garetosmab to thermal, and freezing and thawing stresses and provides an acceptable osmolality in the final formulation.

Arginine was evaluated as an additional stabilizer for the garetosmab liquid formulation. During the assessment, a range of arginine concentrations from 0 to 100 mM was evaluated (Table). The results of the stress test indicates that 70 mM arginine falls in a stable region of the design space with sufficient space on either end to tolerate small variations in the arginine concentration that may be experienced as a result of normal manufacturing variability (Table). 70 mM arginine was chosen as the stabilizer concentration in the garetosmab liquid formulation due to the reduced formation of HMW species and acidic charge variants observed under stress stability conditions and because it provides an acceptable osmolality in the final formulation.

Selection of a Surfactant for the Garetosmab Liquid Formulation 0.1% (w/v) polysorbate 80 was chosen for the garetosmab Phase 1 formulation. Further testing, comparing the stability of 50 mg/mL garetosmab in the presence of polysorbate 20 or polysorbate 80, indicated that both surfactants provided comparable stability to 50 mg/mL garetosmab when incubated at 45° C. for 28 days or at 25° C. for 6 months (Table). Polysorbate 20 was chosen for further development of a garetosmab liquid formulation. The stability of 50 mg/mL garetosmab was assessed when agitated for 30 minutes or incubated at 45° C. for 28 days at varying polysorbate 20 concentrations. The results of the stress test indicates that 0.05% polysorbate 20 falls in a stable region of the design space with sufficient space on either end to tolerate small variations in the polysorbate 20 concentration that may be experienced as a result of normal manufacturing variability (Table and Table). A polysorbate 20 concentration of 0.05% (w/v) was chosen for the garetosmab liquid formulation.

Conclusions

Results of studies testing garetosmab stability when formulations were subjected to stress conditions, incubation at 45° C., vortex agitation and freeze/thaw cycling, were used to select the late-stage formulation. Based on data collected from these studies a garetosmab formulation containing 10 mM histidine, pH 6.3, 5% sucrose, 70 mM arginine-HCl and 0.05% polysorbate 20 was selected and subsequently demonstrated to be suitable for clinical or commercial use. The excipient concentrations were chosen such that small variations that may be experienced during normal manufacturing will have no observable impact on the stability or quality of the garetosmab DP. The selected formulation contains 60 mg/mL garetosmab to provide a 300 mg dose in a withdrawable volume of 5 mL. The suitability of this formulation has been confirmed based on 18 months of long-term development stability data at 5° C., 6 months of accelerated stability data at 25° C./60% RH and stress stability testing including 56 days of stability data at 40° C./75% RH, 8 cycles of freezing and thawing and 120 minutes of agitation (vortex).

TABLE 10

Effect of Histidine Concentration on the Stability of 50 mg/mL Garetosmab Incubated at 45° C. for 28 Days Formulation 50 mg/mL garetosmab, pH 6.3
Fill Volume 0.3 mL
Container/Closure 2 mL Type 1 borosilicate glass vial with a FluroTec ® coated 4432/50 butyl rubber stopper

| Histidine concentration | Lot Number | Color and Appearance | Turbidity (Increase in OD at 405 nm) | pH | % Total Protein Recovered by RP-UPLC | Change in Purity by SE-UPLC[a] | | | Change in Charged Variants by CEX-UPLC[a] | | |
|---|---|---|---|---|---|---|---|---|---|---|---|
| | | | | | | % HMW | % Native | % LMW | % Acidic | % Main | % Basic |
| 5 mM | L16-1298 | Pass | 0.01 | 6.4 | 104 | 3.2 | −3.7 | 0.5 | 13.5 | −15.2 | 1.7 |
| 10 mM | L16-1299 | Pass | 0.01 | 6.4 | 103 | 2.9 | −3.5 | 0.6 | 13.5 | −14.6 | 1.2 |
| 25 mM | L16-1300 | Pass | 0.01 | 6.4 | 103 | 2.6 | −3.2 | 0.6 | 13.5 | −14.6 | 1.1 |

[a]Reported as a change in purity relative to the starting material. The starting material (no incubation) contains ≥98.6% native peak by SE-UPLC and ≥50.3% main peak by CEX-UPLC in all formulations. Negative numbers indicate a decrease in the measured attribute and positive numbers indicate an increase.

TABLE 11

Effect of Sucrose Concentration on the Stability of 50 mg/mL Garetosmab Incubated at 45° C. for 28 Days Formulation 50 mg/mL garetosmab, 10 mM histidine, pH 6.3
Fill Volume 0.3 mL
Container/Closure 2 mL Type 1 borosilicate glass vial with a FluroTec ® coated 4432/50 butyl rubber stopper

| Sucrose concentration | Lot Number | Color and Appearance | Turbidity (Increase in OD at 405 nm) | pH | % Total Protein Recovered by RP-UPLC | Change in Purity by SE-UPLC[a] | | | Change in Charged Variants by CEX-UPLC[a] | | |
|---|---|---|---|---|---|---|---|---|---|---|---|
| | | | | | | % HMW | % Native | % LMW | % Acidic | % Main | % Basic |
| 0% | L16-1306 | Pass | 0.00 | 6.4 | 100 | 3.0 | −3.5 | 0.5 | 13.2 | −14.0 | 0.8 |
| 2.5% | L16-1307 | Pass | 0.00 | 6.4 | 102 | 2.7 | −3.2 | 0.6 | 13.0 | −13.4 | 0.4 |
| 5% | L16-1308 | Pass | 0.00 | 6.3 | 101 | 2.5 | −3.0 | 0.5 | 13.2 | −13.9 | 0.7 |
| 7.5% | L16-1309 | Pass | 0.00 | 6.3 | 101 | 2.5 | −3.0 | 0.5 | 13.9 | −14.5 | 0.6 |
| 10% | L16-1310 | Pass | 0.00 | 6.3 | 102 | 2.2 | −2.8 | 0.6 | 13.2 | −14.7 | 1.5 |

[a]Reported as a change in purity relative to the starting material. The starting material (no incubation) contains ≥98.8% native peak by SE-UPLC and ≥50.2% main peak by CEX-UPLC in all formulations. Negative numbers indicate a decrease in the measured attribute and positive numbers indicate an increase.

TABLE 12

Effect of Sucrose Concentration on the Stability of 50 mg/mL Garetosmab After 8 Cycles of Freezing and Thawing Formulation 50 mg/mL garetosmab, 10 mM histidine, pH 6.3
Fill Volume 0.3 mL
Container/Closure 2 mL Type 1 borosilicate glass vial with a FluroTec ® coated 4432/50 butyl rubber stopper

| Sucrose concentration | Lot Number | Color and Appearance | Turbidity (Increase in OD at 405 nm) | pH | % Total Protein Recovered by RP-UPLC | Change in Purity by SE-UPLC[a] | | | Change in Charged Variants by CEX-UPLC[a] | | |
|---|---|---|---|---|---|---|---|---|---|---|---|
| | | | | | | % HMW | % Native | % LMW | % Acidic | % Main | % Basic |
| 0% | L16-1306 | Pass | 0.00 | 6.3 | 98 | 0.7 | −0.9 | 0.2 | −0.7 | 0.7 | 0.0 |
| 2.5% | L16-1307 | Pass | 0.00 | 6.3 | 98 | 0.1 | −0.3 | 0.2 | −0.5 | 0.5 | 0.0 |
| 5% | L16-1308 | Pass | 0.00 | 6.3 | 98 | 0.1 | −0.2 | 0.2 | −0.6 | 0.0 | 0.5 |
| 7.5% | L16-1309 | Pass | 0.00 | 6.3 | 98 | 0.0 | −0.2 | 0.2 | −0.6 | 0.5 | 0.1 |
| 10% | L16-1310 | Pass | 0.00 | 6.3 | 98 | 0.1 | −0.2 | 0.2 | −0.6 | 0.1 | 0.5 |

[a]Reported as a change in purity relative to the starting material. The starting material (no incubation) contains ≥98.8% native peak by SE-UPLC and ≥50.2% main peak by CEX-UPLC in all formulations. Negative numbers indicate a decrease in the measured attribute and positive numbers indicate an increase.

TABLE 13

Effect of Arginine Concentration on the Stability of 50 mg/mL Garetosmab Incubated at 45° C. for 28 Days Formulation 50 mg/mL garetosmab, 10 mM histidine, pH 6.3
Fill Volume 0.3 mL
Container/Closure 2 mL Type 1 borosilicate glass vial with a FluroTec ® coated 4432/50 butyl rubber stopper

| Arginine concentration | Lot Number | Color and Appearance | Turbidity (Increase in OD at 405 nm) | pH | % Total Protein Recovered by RP-UPLC | Change in Purity by SE-UPLC[a] | | | Change in Charged Variants by CEX-UPLC[a] | | |
|---|---|---|---|---|---|---|---|---|---|---|---|
| | | | | | | % HMW | % Native | % LMW | % Acidic | % Main | % Basic |
| 0 mM | L16-1403 | Pass | 0.00 | 6.4 | 102 | 3.0 | −3.6 | 0.6 | 13.2 | −14.4 | 1.2 |
| 25 mM | L16-1311 | Pass | 0.00 | 6.4 | 102 | 2.3 | −2.9 | 0.6 | 11.1 | −12.5 | 1.5 |
| 50 mM | L16-1312 | Pass | 0.00 | 6.4 | 100 | 2.3 | −2.9 | 0.6 | 10.6 | −13.7 | 3.1 |
| 70 mM | L16-1313 | Pass | 0.00 | 6.3 | 99 | 2.2 | −2.8 | 0.6 | 10.3 | −12.9 | 2.6 |
| 100 mM | L16-1314 | Pass | 0.00 | 6.4 | 98 | 2.3 | −3.0 | 0.7 | 9.7 | −11.5 | 1.8 |

[a]Reported as a change in purity relative to the starting material. The starting material (no incubation) contains ≥98.8% native peak by SE-UPLC and ≥50.3% main peak by CEX-UPLC in all formulations. Negative numbers indicate a decrease in the measured attribute and positive numbers indicate an increase.

TABLE 14

Stability of 50 mg/mL Garetosmab Liquid Formulation in the Presence of 0.05% Polysorbate 20 or 0.05% Polysorbate 80 Incubated at 45° C. for 28 Days or 25° C. for 6 Months Formulation 50 mg/mL garetosmab, 10 mM Histidine, pH 6.3, 5% sucrose, 70 mM arginine
Fill Volume 0.5 mL
Container/Closure 2 mL Type 1 borosilicate glass vial with a FluroTec ® coated 4432/50 butyl rubber stopper

| Formulation | Lot Number | Color and Appearance | Turbidity (Increase in OD at 405 nm) | pH | % Total Protein Recovered by RP-UPLC | Change in Purity by SE-UPLC[a] | | | Change in Charged Variants by CEX-UPLC[a] | | |
|---|---|---|---|---|---|---|---|---|---|---|---|
| | | | | | | % HMW | % Native | % LMW | % Acidic | % Main | % Basic |
| 45° C. 0.05% Polysorbate 20, 28 days | L13-883 | Pass | 0.01 | 6.4 | 104 | 2.2 | −2.9 | 0.6 | 7.0 | −10.6 | 3.6 |
| 45° C. 0.05% Polysorbate 80, 28 days | L13-884 | Pass | 0.01 | 6.4 | 104 | 2.1 | −2.7 | 0.6 | 9.5 | −13.6 | 4.1 |
| 25° C. 0.05% Polysorbate 20, 6 months | L13-883 | Pass | 0.01 | 6.4 | 102 | 0.1 | −0.4 | 0.3 | 2.8 | −8.2 | 5.4 |
| 25° C. 0.05% Polysorbate 80, 6 months | L13-884 | Pass | 0.01 | 6.4 | 103 | 0.2 | −0.1 | −0.1 | 3.7 | −10.2 | 6.5 |

[a]Reported as a change in purity relative to the starting material. The starting material (no incubation) contains ≥98.9% native peak by SE-UPLC and ≥55.5% main peak by CEX-UPLC in all formulations. Negative numbers indicate a decrease in the measured attribute and positive numbers indicate an increase.

TABLE 15

Effect of Polysorbate 20 Concentration on the Stability of 50 mg/mL Garetosmab After Agitation for 30 Minutes Formulation 50 mg/mL garetosmab, 10 mM histidine, pH 6.3, x % polysorbate 20
Fill Volume 0.5 mL
Container/Closure 2 mL Type 1 borosilicate glass vial with a FluroTec ® coated 4432/50 butyl rubber stopper

| Polysorbate 20 concentration | Lot Number | Color and Appearance | Turbidity (Increase in OD at 405 nm) | pH | % Total Protein Recovered by RP-UPLC | Change in Purity by SE-UPLC[a] | | | Change in Charged Variants by CEX-UPLC[a] | | |
|---|---|---|---|---|---|---|---|---|---|---|---|
| | | | | | | % HMW | % Native | % LMW | % Acidic | % Main | % Basic |
| 0.025% | L16-1302 | Pass | 0.00 | 6.3 | 100 | 0.0 | 0.0 | 0.0 | 0.0 | 0.4 | −0.5 |
| 0.05% | L16-1303 | Pass | 0.00 | 6.3 | 100 | 0.0 | −0.1 | 0.0 | 0.1 | 0.2 | −0.3 |

TABLE 15-continued

Effect of Polysorbate 20 Concentration on the Stability of 50 mg/mL Garetosmab After Agitation for 30 Minutes

| 0.075% | L16-1304 | Pass | 0.00 | 6.3 | 100 | 0.0 | 0.0 | 0.0 | −0.1 | −0.2 | 0.3 |
| 0.1% | L16-1305 | Pass | 0.00 | 6.4 | 100 | 0.0 | −0.1 | 0.1 | 0.0 | 0.0 | 0.0 |

[a]Reported as a change in purity relative to the starting material. The starting material (no incubation) contains ≥98.8% native peak by SE-UPLC and ≥50.1% main peak by CEX-UPLC in all formulations. Negative numbers indicate a decrease in the measured attribute and positive numbers indicate an increase.

TABLE 16

Effect of Polysorbate 20 Concentration on the Stability of 50 mg/mL Garetosmab Incubated at 45° C. for 28 Days Formulation 50 mg/mL garetosmab, 10 mM histidine, pH 6.3, x % polysorbate 20
Fill Volume 0.5 mL
Container/Closure 2 mL Type 1 borosilicate glass vial with a FluroTec ® coated 4432/50 butyl rubber stopper

| Polysorbate 20 concentration | Lot Number | Color and Appearance | Turbidity (Increase in OD at 405 nm) | pH | % Total Protein Recovered by RP-UPLC | Change in Purity by SE-UPLC[a] | | | Change in Charged Variants by CEX-UPLC[a] | | |
|---|---|---|---|---|---|---|---|---|---|---|---|
| | | | | | | % HMW | % Native | % LMW | % Acidic | % Main | % Basic |
| 0.025% | L16-1302 | Pass | 0.01 | 6.4 | 103 | 3.2 | −3.8 | 0.6 | 13.7 | −14.7 | 1.0 |
| 0.05% | L16-1303 | Pass | 0.01 | 6.4 | 104 | 3.1 | −3.7 | 0.6 | 13.5 | −13.9 | 0.4 |
| 0.075% | L16-1304 | Pass | 0.01 | 6.4 | 103 | 3.1 | −3.6 | 0.6 | 13.2 | −13.7 | 0.4 |
| 0.1% | L16-1305 | Pass | 0.01 | 6.4 | 103 | 3.1 | −3.7 | 0.6 | 13.6 | −15.8 | 2.2 |

[a]Reported as a change in purity relative to the starting material. The starting material (no incubation) contains ≥98.8% native peak by SE-UPLC and ≥50.1% main peak by CEX-UPLC in all formulations. Negative numbers indicate a decrease in the measured attribute and positive numbers indicate an increase.

Example 3: Stability Studies

The suitability of the garetosmab liquid formulation developed and intended for late-stage clinical and commercial use was confirmed with long-term, accelerated and stress stability studies. In addition, the robustness of the commercial formulation was confirmed using a Design-Of-Experiment (DOE) approach.

Studies were initiated to evaluate the storage, accelerated and stress stability of a research lot of garetosmab DP. The FDS lot used for these studies is representative of the FDS manufactured for clinical use. The DP configuration used in these studies was identical to the DP configuration used in Phase 2 clinical studies and was produced by filling 5.5 mL of FDS into 10 mL Type 1 glass vials.

Research Storage, Accelerated and Stress Stability for Garetosmab Drug Product

Garetosmab DP was physically and chemically stable when stored at 2-8° C. for at least 12 months, 18 months or 24 months (
Table). No appreciable changes were detected in any of the monitored attributes. Results from the analysis of the garetosmab DP after incubation under stress and accelerated temperature conditions are provided in Table. After incubation for 56 days at 40° C./75% RH, some formation of HMW species, LMW species and charge variants (increased relative percentage of acidic species (Region 1)) were detected. Following incubation at 25° C./60% RH for 6 months, no increase in HMW species was observed by SE-UPLC, but some increases in acidic species (Region 1) were observed by CEX-UPLC and icIEF. Furthermore, small increases in LMW species were observed by non-reduced and reduced MCE, respectively, after incubation for 6 months at 25° C./60% RH. No meaningful changes in any of the other monitored attributes were observed. The liquid DP will be exposed to room temperature conditions for only short periods of time. Temperatures above room temperature will be avoided.

Results from the analysis of the garetosmab DP after being subjected to agitation or multiple cycles of freezing and thawing are shown in Table. No meaningful changes in any of the monitored attributes were observed when garetosmab DP was subjected to 120 minutes of agitation or 8 cycles of freezing and thawing. The results of this research stability study confirmed that the garetosmab formulation developed for commercial use is suitable and provides a stable drug product.

TABLE 17

Research Stability of Garetosmab Liquid Drug Product Stored at 2-8° C.

Formulation 60 mg/mL garetosmab, 10 mM histidine, pH 6.3, 70 mM arginine-HCl, 5% sucrose, 0.05% polysorbate 20
Fill Volume 5.5 mL
Container/Closure 10 mL Type 1 borosilicate glass vials with a West S10-F451W 4432/50 GRY B2-40 stopper

| | Length of Storage at 2-8° C. (months) | | | | | | | | |
|---|---|---|---|---|---|---|---|---|---|
| Assay | 0 | 1 | 2 | 3 | 6 | 9 | 12 | 18 | 24 |
| Color and Appearance | Pass | Pass | Pass | Pass | Pass | Pass | Pass | Pass | Pass |
| Turbidity (Increase in OD at 405 nm) | 0.00 | 0.00 | 0.00 | 0.00 | 0.00 | 0.00 | 0.00 | 0.00 | 0.00 |

TABLE 17-continued

Research Stability of Garetosmab Liquid Drug Product Stored at 2-8° C.

| | | | | | | | | | | |
|---|---|---|---|---|---|---|---|---|---|---|
| pH | | 6.3 | 6.3 | 6.3 | 6.4 | 6.3 | 6.3 | 6.4 | 6.3 | 6.4 |
| Particulate Analysis by HIAC (particles per container) | ≥10 μm | 33 | NR | NR | NR | 11 | NR | 61 | 28 | 28 |
| | ≥25 μm | 0 | NR | NR | NR | 0 | NR | 0 | 0 | 0 |
| Particulate Analysis by MFI (particles per mL) | 2 to 10 μm | 59 | NR | NR | NR | 940 | NR | 2303 | 1664 | 2934 |
| | ≥10 μm | 5 | NR | NR | NR | 12 | NR | 9 | 4 | 3 |
| | ≥25 μm | 1 | NR | NR | NR | 3 | NR | 3 | 2 | 2 |
| % Total Protein Recovered by RP-UPLC | | 100 | 101 | 106 | 101 | 101 | 96 | 100 | 98 | 100 |
| Non-reduced MCE | % Main Peak Purity | 96.6 | NR | NR | NR | 96.1 | NR | 96.7 | 96.1 | 96.5 |
| | % LMW Species | 3.0 | NR | NR | NR | 3.4 | NR | 3.2 | 3.5 | 3.1 |
| | % HMW Species | 0.5 | NR | NR | NR | 0.5 | NR | 0.2 | 0.5 | 0.4 |
| Reduced MCE | % Purity | 94.7 | NR | NR | NR | 94.6 | NR | 95.0 | 94.2 | 94.5 |
| | % LMW Species | 1.9 | NR | NR | NR | 2.1 | NR | 1.8 | 2.5 | 2.0 |
| | % NGHC | 1.5 | NR | NR | NR | 1.5 | NR | 1.5 | 1.7 | 1.5 |
| Purity by SE-UPLC | % HMW species | 0.8 | 0.7 | 0.7 | 0.7 | 0.7 | 0.7 | 0.7 | 0.7 | 0.7 |
| | % Main peak purity | 98.7 | 98.6 | 98.8 | 98.8 | 98.2 | 98.6 | 98.4 | 98.1 | 98.1 |
| | % LMW species | 0.5 | 0.7 | 0.5 | 0.5 | 1.1 | 0.7 | 0.9 | 1.2 | 1.2 |
| Charge Variant Analysis by CEX-UPLC | % Region 1 | 24.1 | 24.2 | 24.1 | 23.7 | 24.4 | 24.6 | 22.4 | 24.4 | 24.6 |
| | % Region 2 | 55.6 | 57.5 | 57.7 | 58.2 | 57.5 | 58.1 | 57.9 | 56.9 | 57.5 |
| | % Region 3 | 20.3 | 18.3 | 18.2 | 18.2 | 18.1 | 17.4 | 19.7 | 18.7 | 17.9 |
| Charge Variant Analysis by iCIEF | % Region 1 | 40.6 | NR | NR | NR | 40.9 | NR | 40.0 | 40.6 | 42.4 |
| | % Region 2 | 52.8 | NR | NR | NR | 52.3 | NR | 52.7 | 52.1 | 51.3 |
| | % Region 3 | 6.6 | NR | NR | NR | 6.9 | NR | 7.3 | 7.3 | 6.3 |
| % Relative Potency by Bioassay | | 111 | NR | NR | NR | 110 | NR | 106 | 95 | 99 |

CEX, cation exchange;
DS, drug substance;
FDG, Formulation Development group;
HMW, high molecular weight;
iCIEF, imaged capillary isoelectric focusing;
LMW, low molecular weight;
MCE, microchip capillary electrophoresis;
MFI, Micro-Flow Imaging ™;
NR, not required;
OD, optical density;
RP, reversed-phase;
SE, size exclusion;
UPLC, ultra-performance liquid chromatography

TABLE 18

Research Stability of Garetosmab
Liquid Drug Product Stored Under Accelerated Conditions Formulation: 60 mg/mL garetosmab, 10 mM histidine, pH 6.3, 70 mM arginine-HCl, 5% sucrose, 0.05% polysorbate 20
Fill Volume: 5.5 mL
Container/Closure: 10 mL Type 1 borosilicate glass vials with a West S10-F451W 4432/50 GRY B2-40 stopper

| Assay | | No Storage T = 0 | 25° C./60% RH Storage (months) | | | | 40° C./75% RH Storage (days) | | | |
|---|---|---|---|---|---|---|---|---|---|---|
| | | | 1 | 2 | 3 | 6 | 7 | 14 | 28 | 56 |
| Color and Appearance | | Pass | Pass | Pass | Pass | Pass | Pass | Pass | Pass | Pass |
| Turbidity (Increase in OD at 405 nm) | | 0.00 | 0.00 | 0.00 | 0.00 | 0.00 | 0.01 | 0.01 | 0.01 | 0.00 |
| pH | | 6.3 | 6.4 | 6.3 | 6.4 | 6.3 | 6.3 | 6.4 | 6.4 | 6.3 |
| Particulate Analysis by HIAC (particles per container) | ≥10 μm | 33 | NR | NR | 28 | 6 | NR | NR | 6 | 61 |
| | ≥25 μm | 0 | NR | NR | 0 | 0 | NR | NR | 0 | 0 |

TABLE 18-continued

Research Stability of Garetosmab
Liquid Drug Product Stored Under Accelerated Conditions

| | | | | | | | | | | |
|---|---|---|---|---|---|---|---|---|---|---|
| Particulate Analysis by MFI (particles per mL) | 2 to 10 μm | 59 | NR | NR | 774 | 1468 | NR | NR | 641 | 308 |
| | ≥10 μm | 5 | NR | NR | 7 | 10 | NR | NR | 19 | 9 |
| | ≥25 μm | 1 | NR | NR | 3 | 1 | NR | NR | 5 | 1 |
| % Total Protein Recovered by RP-UPLC | | 100 | 102 | 106 | 101 | 102 | 101 | 101 | 101 | 102 |
| Non-reduced MCE | % Main Peak Purity | 96.6 | NR | NR | 96.3 | 95.2 | NR | NR | 95.6 | 93.7 |
| | % LMW Species | 3.0 | NR | NR | 3.3 | 4.3 | NR | NR | 3.9 | 5.6 |
| | % HMW Species | 0.5 | NR | NR | 0.4 | 0.5 | NR | NR | 0.6 | 0.7 |
| Reduced MCE | % Purity | 94.7 | NR | NR | 93.4 | 92.3 | NR | NR | 93.6 | 91.5 |
| | % LMW Species | 1.9 | NR | NR | 2.9 | 4.0 | NR | NR | 2.9 | 4.6 |
| | % NGHC | 1.5 | NR | NR | 1.5 | 1.6 | NR | NR | 1.6 | 1.7 |
| Purity by SE-UPLC | % HMW species | 0.8 | 0.7 | 0.7 | 0.8 | 0.8 | 0.8 | 0.9 | 1.1 | 1.6 |
| | % Main peak purity | 98.7 | 98.6 | 98.6 | 98.6 | 98.1 | 98.6 | 98.5 | 98.2 | 97.5 |
| | % LMW species | 0.5 | 0.7 | 0.7 | 0.6 | 1.1 | 0.6 | 0.7 | 0.8 | 0.9 |
| Charge Variant Analysis by CEX-UPLC | % Region 1 | 24.1 | 24.4 | 25.2 | 25.8 | 29.6 | 24.3 | 26.1 | 30.6 | 39.1 |
| | % Region 2 | 55.6 | 57.3 | 56.9 | 56.6 | 53.3 | 58.0 | 56.6 | 52.1 | 45.1 |
| | % Region 3 | 20.3 | 18.3 | 17.9 | 17.5 | 17.1 | 17.7 | 17.3 | 17.3 | 15.7 |
| Charge Variant Analysis by iCIEF | % Region 1 | 40.6 | NR | NR | 44.4 | 48.9 | NR | 44.4 | 51.6 | 60.0 |
| | % Region 2 | 52.8 | NR | NR | 48.1 | 45.2 | NR | 48.8 | 42.6 | 34.5 |
| | % Region 3 | 6.6 | NR | NR | 7.6 | 6.0 | NR | 6.8 | 5.7 | 5.5 |

CEX, cation exchange;
DS, drug substance;
FDG, Formulation Development group HMW, high molecular weight;
iCIEF, imaged capillary isoelectric focusing;
LMW, low molecular weight;
MCE, microchip capillary electrophoresis;
MFI, Micro-Flow Imaging ™;
NR, not required;
OD, optical density;
RH, relative humidity;
RP, reversed-phase;
SE, size exclusion;
UPLC, ultra- performance liquid chromatography

TABLE 19

Research Stability of Garetosmab Liquid
Drug Product to Agitation and Freezing and Thawing Stress Formulation: 60 mg/mL garetosmab, 10 mM histidine, pH 6.3, 70 mM arginine-HCl, 5% sucrose, 0.05% polysorbate 20
Fill Volume: 5.5 mL
Container/Closure: 10 mL Type 1 borosilicate glass vials with a West S10-F451W 4432/50 GRY B2-40 stopper

| Assay | | No Storage T = 0 | Agitation by Vortex (minutes) 30 | 60 | 120 | #Freezing and Thawing Cycles 4 | 8 |
|---|---|---|---|---|---|---|---|
| Color and Appearance | | Pass | Pass | Pass | Pass | Pass | Pass |
| Turbidity (Increase in OD at 405 nm) | | 0.00 | 0.00 | 0.00 | 0.00 | 0.00 | 0.00 |
| pH | | 6.3 | 6.3 | 6.3 | 6.3 | 6.3 | 6.3 |
| Particulate Analysis by HIAC (particles per container) | ≥10 μm | 33 | NR | NR | 66 | NR | 77 |
| | ≥25 μm | 0 | NR | NR | 11 | NR | 6 |
| Particulate Analysis by MFI (particles per mL) | 2 to 10 μm | 59 | NR | NR | 1362 | NR | 695 |
| | ≥10 μm | 5 | NR | NR | 13 | NR | 10 |
| | ≥25 μm | 1 | NR | NR | 3 | NR | 3 |
| % Total Protein Recovered by RP-UPLC | | 100 | 101 | 101 | 100 | 101 | 103 |
| Non-reduced MCE | % Main Peak Purity | 96.6 | NR | NR | 96.5 | NR | 96.7 |
| | % LMW Species | 3.0 | NR | NR | 3.1 | NR | 2.9 |
| | % HMW Species | 0.5 | NR | NR | 0.4 | NR | 0.5 |
| Reduced MCE | % Purity | 94.7 | NR | NR | 94.8 | NR | 95.3 |
| | % LMW Species | 1.9 | NR | NR | 1.9 | NR | 1.6 |
| | % NGHC | 1.5 | NR | NR | 1.6 | NR | 1.4 |
| Purity by SE-UPLC | % HMW species | 0.8 | 0.8 | 0.7 | 0.8 | 0.8 | 0.8 |
| | % Main peak purity | 98.7 | 98.7 | 98.6 | 98.6 | 98.7 | 98.6 |
| | % LMW species | 0.5 | 0.6 | 0.6 | 0.6 | 0.6 | 0.6 |
| Charge Variant Analysis by CEX-UPLC | % Region 1 | 24.1 | 24.2 | 23.3 | 24.2 | 23.6 | 23.6 |
| | % Region 2 | 55.6 | 55.7 | 56.4 | 55.5 | 58.5 | 58.6 |
| | % Region 3 | 20.3 | 20.1 | 20.3 | 20.3 | 17.9 | 17.8 |
| Charge Variant Analysis by iCIEF | % Region 1 | 40.6 | NR | NR | 42.1 | NR | 40.7 |
| | % Region 2 | 52.8 | NR | NR | 51.2 | NR | 51.4 |
| | % Region 3 | 6.6 | NR | NR | 6.7 | NR | 7.9 |

CEX, cation exchange;
DS, drug substance;
FDG, Formulation Development group;
HMW, high molecular weight;
iCIEF, imaged capillary isoelectric focusing;
LMW, low molecular weight;
MCE, microchip capillary electrophoresis;
MFI, Micro-Flow Imaging™;
NR, not required;
OD, optical density;
RH, relative humidity;
RP, reversed-phase;
SE, size exclusion;
UPLC, ultra- performance liquid chromatography Conclusions The results from the long-term storage, accelerated, and stress stability studies of the garetosmab DP support the clinical use of this product. garetosmab DP can withstand short exposures to room temperature without compromising physical or chemical stability. Garetosmab DP will be stored at 2° C. to 8° C. and exposure to temperatures greater than 2° C. to 8° C. will be limited.

Example 4: Robustness Studies

Normal variation in the composition of garetosmab DP may occur during manufacturing, including variations in the concentration of garetosmab, the concentration of the excipients (histidine, arginine, sucrose, or polysorbate 20), and/or the pH of the formulation. Because variations in any of these formulation factors could potentially impact the stability or quality of the DP, formulation robustness studies were conducted to assess the impact of such variations, within defined ranges.

Two DOE studies were used to evaluate the effect of each individual formulation factor as well as the influence of interactions between factors on the formulation stability:

Preliminary robustness study-DOE study with accelerated and stress stability assessment to identify the key formulation factors that may impact garetosmab DP stability.

Final robustness study—a comprehensive DOE study evaluating the key formulation factors identified from the preliminary robustness study, with stress, accelerated, and long-term shelf-life stability to evaluate garetosmab formulation robustness.

The nominal composition of the garetosmab commercial formulation consists of 60 mg/mL Garetosmab, 10 mM histidine, 5% (w/v) sucrose, 70 mM arginine-HCl, 0.05% (w/v) polysorbate 20, at pH 6.3.

The purpose of this preliminary robustness study was to examine main effects and the combined effects of several factors (interactions and quadratics) on the stability of garetosmab and identify factors that should be included in a comprehensive robustness study (main effects are the formulation factors, interactions describe interactions between two different factors, and quadratics describe interactions where a factor interacts with itself). All main effects were examined in this study. A subset of interactions and quadratics were chosen to be examined based on a risk assessment informed by prior experience with garetosmab. Based on the risk assessment a 6-factor D-optimal DOE study was developed to characterize and explore the excipient design space. A 24-run study was developed which considered main effects, and the interactions and quadratics that were defined in the risk assessment. The design was created, evaluated and confirmed in JMP12.1 to be properly powered and able to cover the design space with good estimation capability. The preliminary robustness study design is described in Table, Table, and Table.

TABLE 20

Factors tested in the garetosmab preliminary robustness study

| Formulation factor | Target level | Range tested | Variation from Target |
|---|---|---|---|
| Garetosmab Concentration | 60 mg/ml | 54-66 mg/mL | ±10% |
| Sucrose Concentration | 5% | 4-6% | ±20% |
| Arginine Concentration | 70 mM | 56-84 mM | ±20% |
| Histidine Concentration | 10 mM | 8-12 mM | ±20% |
| pH | 6.3 | 6.0-6.6 | ±0.3 pH units |
| Polysorbate 20 concentration | 0.05% | 0.025-0.075% | ±50% |

TABLE 21

Formulations assessed in the garetosmab preliminary robustness study

| Formulation # | Lot # | Protein, mg/mL | Histidine, mM | pH | Sucrose, % (w/v) | Arginine, mM | Polysorbate 20, % (w/v) |
|---|---|---|---|---|---|---|---|
| F1 | L18-2712 | 66 | 8 | 6.6 | 6 | 56 | 0.025 |
| F2 | L18-2713 | 54 | 8 | 6.6 | 6 | 84 | 0.075 |
| F3 | L18-2714 | 66 | 10 | 6.6 | 6 | 70 | 0.075 |
| F4 | L18-2715 | 54 | 8 | 6.0 | 4 | 84 | 0.025 |
| F5 | L18-2716 | 54 | 10 | 6.6 | 4 | 84 | 0.025 |
| F6 | L18-2717 | 66 | 8 | 6.0 | 6 | 84 | 0.075 |
| F7 | L18-2718 | 66 | 12 | 6.6 | 4 | 56 | 0.075 |
| F8 | L18-2719 | 66 | 8 | 6.6 | 4 | 84 | 0.025 |
| F9 | L18-2720 | 66 | 8 | 6.0 | 4 | 56 | 0.075 |
| F10 | L18-2721 | 54 | 12 | 6.3 | 4 | 84 | 0.025 |
| F11 | L18-2722 | 54 | 10 | 6.3 | 6 | 56 | 0.075 |
| F12 | L18-2723 | 66 | 10 | 6.0 | 4 | 70 | 0.025 |
| F13 | L18-2724 | 54 | 8 | 6.6 | 4 | 56 | 0.075 |
| F14 | L18-2725 | 54 | 12 | 6.6 | 4 | 70 | 0.075 |
| F15 | L18-2726 | 66 | 12 | 6.6 | 6 | 84 | 0.075 |
| F16 | L18-2727 | 54 | 12 | 6.0 | 6 | 84 | 0.075 |
| F17 | L18-2728 | 54 | 12 | 6.6 | 6 | 56 | 0.025 |
| F18 | L18-2729 | 54 | 12 | 6.0 | 4 | 56 | 0.075 |
| F19 | L18-2730 | 66 | 8 | 6.3 | 4 | 70 | 0.075 |
| F20 | L18-2731 | 66 | 12 | 6.0 | 4 | 84 | 0.025 |
| F21 | L18-2732 | 54 | 8 | 6.0 | 6 | 56 | 0.025 |
| F22 | L18-2733 | 54 | 8 | 6.0 | 6 | 70 | 0.025 |
| F23 | L18-2734 | 66 | 12 | 6.0 | 6 | 56 | 0.025 |
| F24 | L18-2735 | 66 | 12 | 6.3 | 6 | 70 | 0.025 |

TABLE 22

Storage conditions and sampling intervals for garetosmab preliminary robustness study

| Incubation Temperature | Sampling intervals |
|---|---|
| 25° C. | 1, 3, 6 months |
| 45° C. | 7, 14, 21, 28 days |
| t = 0 | 0 (days) |

Results

In the preliminary garetosmab robustness study, the stability of garetosmab as a function of varying formulation was assessed at both 25° C. and 45° C. However, the factors chosen for the final robustness study were based on the rates of degradation determined at 45° C. only. If the rate of change of a response had p≤0.05 for a specific factor (including main effects, interactions and quadratics), that factor was considered statistically significant and would be considered for the final robustness study. Table shows a summary of the results of the DOE analysis indicating the statistically significant responses and associated terms. The responses considered in the DOE analysis were the rate of change per day in HMW, LMW, and monomer by SE-UPLC, and the rate of change per day in acidic species, main peak, and basic species by CEX-UPLC and icIEF. Other responses, including visual appearance, turbidity by OD 405 nm, pH, protein concentration (recovery) and sub-visible particles by MFI, were measured but were considered pass/fail or for information and not used in the DOE analysis.

TABLE 23

Statistically significant responses, associated factors, rates and P-values.

| Response | Term | Impact to the rate per day[a] | p-value[b] |
|---|---|---|---|
| Acidic rate 45° C. per day | pH | 0.116 | 0.000 |
| Main rate 45° C. per day | pH | −0.079 | 0.000 |
| Basic rate 45° C. per day | pH | −0.037 | 0.000 |
| icIEF basic 45° C. per day | pH | −0.025 | 0.002 |
| Acidic rate 45° C. per day | **Histidine*pH | 0.015 | 0.003** |
| Monomer rate 45° C. per day | Sucrose | 0.005 | 0.003 |
| HMW rate 45° C. per day | garetosmab | 0.004 | 0.004 |
| HMW rate 45° C. per day | Sucrose | −0.004 | 0.004 |
| Monomer rate 45° C. per day | garetosmab | −0.004 | 0.004 |
| HMW rate 45° C. per day | pH | −0.004 | 0.004 |
| Monomer rate 45° C. per day | pH | 0.004 | 0.009 |
| Acidic rate 45° C. per day | **garetosmab*pH | −0.010 | 0.011** |
| icIEF acidic 45° C. per day | pH | 0.055 | 0.018 |
| icIEF basic 45° C. per day | **Histidine*Histidine | −0.033 | 0.025** |
| Acidic rate 45° C. per day | Arginine | −0.008 | 0.031 |
| Monomer rate 45° C. per day | Arginine | −0.003 | 0.037 |
| icIEF basic 45° C. per day | **Arginine*Arginine | 0.026 | 0.041** |

Highlighted in bold are the statistically significant, non-main effect terms based on stress stability testing at 45° C.
[a]Rates are derived from scaled estimates reported in JMP. The reported rates are 2-times the scaled estimates, as the scaled estimates are half-estimates.
[b]p-values ≤ 0.05 are considered significant in this study.

Results of visual inspection, turbidity by OD 405 nm, pH, protein recovery and sub-visible particles by MFI were: all samples passed visual inspection; no meaningful increases in OD 405 nm were observed for any sample; no changes in protein concentrations were observed. All concentration measurements were within 5% of the t=0 values; and some fluctuations in particle concentrations by MFI were observed as well as some increasing trends. Some trends were statistically significant but those that were significant were not practically meaningful.

Conclusions

The results of the DOE analysis indicated that the following non-main effect factors had a statistically significant effect on garetosmab stability under thermal stress conditions (incubation at 45° C. for 28 days).

[Histidine]*pH
[garetosmab]*pH
[Histidine]*[Histidine]
[Arginine]*[Arginine] These interactions and quadratics were included in the final robustness study along with all main effects. A detailed summary of the preliminary robustness study including data from incubation at 45° C. and 25° C. is discussed in report EXP-9 Jul. 2019-0096 garetosmab Pre-PAR Study. Garetosmab final robustness study design The formulation factor ranges tested in this study were defined to be wider than or equal to the ranges that were anticipated to occur if one considers both contributions from manufacturing variability and assay variability. The formulation parameters in this robustness study include garetosmab concentration (+10% which is the specification limit), buffer and stabilizer concentrations (+20%), surfactant concentration (+50%), and pH (+0.3 units which is the specification limit) (Table).

To evaluate the impact of the key formulation factors identified from the preliminary robustness study on the storage and stress stability of the garetosmab formulation, a 6-factor D-optimal DOE design was executed to characterize and explore the excipient design space. A 14-run study (Table) was designed which considered all main effects, and the secondary interactions and quadratics identified as statistically significant in the preliminary robustness study. The design was created, evaluated and confirmed in JMP12.1 to be sufficiently powered and able to cover the design space with good estimation capability. In addition to the test formulations, one formulation with all factors at the nominal levels was included as a control but excluded from the DOE analysis. 10 mL type 1 glass vials were filled with 5.5 mL of formulation, which is representative of the commercial DP presentation. Each formulation was assessed for long-term storage stability at 2° C. to 8° C., accelerated stability at 25° C./60% RH and stress conditions; 40° C./75% RH, and agitation and freezing and thawing stress (storage and stress conditions are summarized in Table 26: Analysis Plan for garetosmab

| Assay | Time Points | Purpose |
|---|---|---|
| Visual appearance | All | Color change, precipitation, particles |
| Turbidity, OD @ 405 nm | | Precipitation |
| pH | | pH changes |
| RP-HPLC | | Protein concentration and recovery |
| SE-HPLC | | Chemical stability, high and low MW species |
| CEX-HPLC | | Chemical stability, charge variants, deamidation |
| icIEF | 0, 3, 6, 12, 18, 24, 36, 48 and 60 month 5° C. | Chemical stability, charge variants, deamidation |
| MCE-SDS (R and NR) | 120 minutes agitation | Chemical stability, high and low MW species |
| MFI | 8× freeze/thaw | Particles |
| HIAC | 1, 2 months 40° C./75% RH 3, 6 months 25° C./60% RH | Particles |

-continued

| Assay | Time Points | Purpose |
|---|---|---|
| CAD-UPLC | 0, 3, 6, 12, 24, 36, 48 and 60 month 5° C. | Polysorbate 20 Concentration |
| Bio-Assay | | Potency/Biological activity). |

All formulations were characterized and assessed for physical and chemical properties and stability, including visual inspection, pH, turbidity, protein concentration and recovery, purity with respect to molecular weight forms (assessed by SE-UPLC and microchip capillary electrophoresis (MCE)), and charge variants (assessed by CEX-UPLC and image capillary iso-electric focusing (icIEF)), and sub-visible particulate analysis (assessed by light obscuration (HIAC) and MFI), as summarized in Table 26.

TABLE 24

Formulations assessed in the garetosmab final robustness study

| Formulation # | Lot # | Protein, mg/mL | Histidine, mM | pH | Sucrose, % (w/v) | Arginine, mM | Polysorbate 20, % (w/v) |
|---|---|---|---|---|---|---|---|
| F1 | L18-3972 | 66 | 8 | 6 | 4 | 56 | 0.025 |
| F2 | L18-3973 | 54 | 12 | 6 | 6 | 56 | 0.025 |
| F3 | L18-3974 | 66 | 8 | 6.6 | 6 | 70 | 0.075 |
| F4 | L18-3975 | 66 | 10 | 6 | 6 | 84 | 0.075 |
| F5 | L18-3976 | 54 | 8 | 6.6 | 4 | 84 | 0.025 |
| F6 | L18-3977 | 66 | 12 | 6 | 4 | 56 | 0.075 |
| F7 | L18-3978 | 54 | 10 | 6 | 4 | 70 | 0.025 |
| F8 | L18-3979 | 54 | 10 | 6.6 | 6 | 56 | 0.025 |
| F9 | L18-3980 | 54 | 12 | 6.6 | 4 | 70 | 0.075 |
| F10 | L18-3981 | 54 | 8 | 6 | 6 | 56 | 0.075 |
| F11 | L18-3982 | 66 | 8 | 6 | 6 | 70 | 0.025 |
| F12 | L18-3983 | 66 | 10 | 6.6 | 4 | 56 | 0.075 |
| F13 | L18-3984 | 54 | 8 | 6 | 4 | 84 | 0.075 |
| F14 | L18-3985 | 66 | 12 | 6.6 | 6 | 84 | 0.025 |
| F15[a] | L18-3986 | 60 | 10 | 6.3 | 5 | 70 | 0.050 |

[a] Formulation 15 was a control formulation where all components were included at the nominal levels of the commercial formulation. This formulation was not included in any of the DOE analyses but was used as a relative measure of the stability of the test formulations.

TABLE 25

Storage conditions and sampling intervals for garetosmab final robustness study

| Storage/Stress Conditions | Sampling Intervals |
|---|---|
| Agitation (vortex) | 30, 60 and 120 minutes |
| Freeze/Thaw (−30° C.) | 4× and 8× |
| 5° C. | 1, 3, 6, 9, 12, 18, 24, 36, 48, 60 months |
| 25° C./60% RH | 1, 2, 3, 6 months |
| 40° C./75% RH | 0.5, 1 and 2 months |
| T = 0 | 0 (days) |

TABLE 26

Analysis Plan for garetosmab

| Assay | Time Points | Purpose |
|---|---|---|
| Visual appearance | All | Color change, precipitation, particles |
| Turbidity, OD @ 405 nm | | Precipitation |
| pH | | pH changes |
| RP-HPLC | | Protein concentration and recovery |
| SE-HPLC | | Chemical stability, high and low MW species |

TABLE 26-continued

Analysis Plan for garetosmab

| Assay | Time Points | Purpose |
|---|---|---|
| CEX-HPLC | | Chemical stability, charge variants, deamidation |
| icIEF | 0, 3, 6, 12, 18, 24, 36, 48 and 60 month 5° C. | Chemical stability, charge variants, deamidation |
| MCE-SDS (R and NR) | | Chemical stability, high and low MW species |
| MFI | 120 minutes agitation | Particles |
| HIAC | 8× freeze/thaw 1, 2 months 40° C./75% RH 3, 6 months 25° C./60% RH | Particles |

TABLE 26-continued

Analysis Plan for garetosmab

| Assay | Time Points | Purpose |
|---|---|---|
| CAD-UPLC | 0, 3, 6, 12, 24, 36, 48 and 60 month 5° C. | Polysorbate 20 Concentration |
| Bio-Assay | | Potency/Biological activity |

Results (Stress temperature 40° C./75% RH)

Garetosmab samples in the formulations listed in Table 24 were incubated at 40° C./75% RH for 2 months. The responses that were considered most important for the DOE analysis were formation of molecular weight variants by SE-UPLC and MCE, and formation of charge variants by CEX-UPLC and icIEF. Additional factors including visual inspection, pH, turbidity, protein concentration and recovery, and particulate levels were measured but were considered pass/fail or for information and not used in the DOE analysis. The factors that led to statistically significant changes in the measured responses are listed in Table. Although several factors had statistically significant impacts to the responses, the effects were small, resulting in relatively small changes in response to variations in the factors under this stress condition. The factor that had the largest effect was pH on the rate of charge variant formation by CEX-UPLC. Although statistically significant, the effect was small. The rate of formation of acidic species varied by 3.8% per month when the pH varied from 6.0-6.6. Overall, under the stress condition tested, the variations in the formulation had little impact to the stability of garetosmab. The variation in the rates is illustrated in FIG. 2. In all cases the spread relative to the control is not meaningful with respect to the overall stability of the formulation.

TABLE 27

Statistically significant responses from the final robustness study for garetosmab formulations incubated at 40° C./75% RH for 2 months.

| Response[a] | Factor | Impact to the rate per month[b] | p-value[c] |
|---|---|---|---|
| HMW | garetosmab | 0.058 | 0.0011 |
| HMW | pH | −0.052 | 0.0022 |
| HMW | Sucrose | −0.040 | 0.0081 |
| HMW | Polysorbate 20 | 0.028 | 0.0357 |
| Acidic CEX | pH | 3.771 | <0.0001 |
| Acidic CEX | Arginine | −0.459 | 0.0230 |
| Acidic CEX | Histidine*pH | 0.850 | 0.0008 |
| Main Peak CEX | pH | 2.492 | <0.0001 |
| Basic CEX | pH | −1.250 | <.0001 |
| Basic CEX | Histidine*pH | −0.654 | 0.0145 |
| Acidic icIEF | pH | 2.334 | <0.0001 |
| Acidic icIEF | Histidine*pH | 1.146 | 0.0042 |
| Main Peak icIEF | garetosmab | 0.476 | 0.0374 |
| Main Peak icIEF | pH | 1.804 | <0.0001 |
| Main Peak icIEF | Histidine*pH | 0.783 | 0.0102 |
| Basic icIEF | garetosmab | 0.244 | 0.0429 |
| Basic icIEF | pH | −0.524 | 0.0014 |
| Basic icIEF | Arginine | 0.311 | 0.0376 |
| Basic icIEF | Histidine*pH | −0.344 | 0.0251 |
| Purity reduced MCE | garetosmab | −0.333 | 0.0245 |
| Purity reduced MCE | pH | −0.369 | 0.0159 |
| Purity reduced MCE | Sucrose | 0.379 | 0.0137 |
| LMW reduced MCE | garetosmab | 0.246 | 0.0465 |
| LMW reduced MCE | pH | 0.343 | 0.0108 |

[a]Reported as rate of formation or loss of the species monitored.
[b]Rates are derived from scaled estimates reported in JMP. The reported rates are 2-times the scaled estimates, as the scaled estimates are half-estimates.
[c]p-values ≤0.05 were considered statistically significant.

Results (accelerated temperature 25° C./60% RH)

Garetosmab samples in the formulations listed in Table were incubated at 25° C./60% RH for up to 6 months. The responses that were considered most important for the DOE analysis were formation of molecular weight variants by SE-UPLC and MCE, and formation of charge variants by CEX-UPLC and icIEF. Additional factors including visual inspection, pH, turbidity, protein concentration and recovery, and particulate levels were measured but were considered pass/fail or for information and not used in the DOE analysis. The factors that led to significant changes in the measured responses are listed in Table. Although several factors had statistically significant impacts to the responses, the effects were small, resulting in less than a 1% variation in the rate per month due to varying the factors, under this accelerated condition. Under the accelerated condition tested, the variations in the formulation had little impact to the stability of garetosmab. The variation in the rates is illustrated in FIG. In all cases the spread relative to the control is not meaningful with respect to the overall stability of the formulation.

TABLE 28

Statistically significant responses from the final robustness study for garetosmab formulations incubated at 25° C./60% RH for 6 months.

| Response[a] | Factor | Impact to the rate per month[b] | p-value[c] |
|---|---|---|---|
| HMW | garetosmab | 0.007 | 0.0011 |
| HMW | pH | 0.004 | 0.0212 |
| HMW | Sucrose | −0.005 | 0.0067 |
| Acidic CEX | Histidine | 0.089 | 0.0415 |
| Acidic CEX | pH | 0.730 | <0.0001 |
| Acidic CEX | Histidine*pH | 0.120 | 0.0103 |
| Main Peak CEX | pH | 0.526 | <0.0001 |
| Basic CEX | Histidine | −0.040 | 0.0272 |
| Basic CEX | pH | −0.210 | <0.0001 |
| Basic CEX | Histidine*pH | −0.052 | 0.0096 |
| Acidic icIEF | Histidine | 0.198 | 0.0267 |
| Acidic icIEF | pH | 0.577 | <0.0001 |
| Acidic icIEF | garetosmab*pH | −0.162 | 0.0283 |
| Acidic icIEF | Histidine*pH | 0.404 | 0.0007 |
| Main Peak icIEF | Histidine | 0.169 | 0.0255 |
| Main Peak icIEF | pH | 0.446 | <0.0001 |
| Main Peak icIEF | garetosmab*pH | −0.121 | 0.0458 |
| Main Peak icIEF | Histidine*pH | 0.247 | 0.0044 |
| Basic icIEF | pH | −0.139 | 0.0064 |
| Basic icIEF | Histidine*pH | −0.157 | 0.0079 |
| Purity reduced MCE | pH | −0.092 | 0.0142 |
| Purity reduced MCE | garetosmab*pH | −0.080 | 0.0298 |
| LMW reduced MCE | garetosmab | 0.042 | 0.0191 |
| LMW reduced MCE | pH | 0.067 | 0.0034 |
| LMW reduced MCE | garetosmab*pH | 0.042 | 0.0191 |
| LMW reduced MCE | Histidine*pH | −0.081 | 0.0029 |
| LMW reduced MCE | Histidine*Histidine | −0.106 | 0.0112 |
| LMW non-reduced MCE | Histidine*Histidine | 0.142 | 0.0396 |
| LMW non-reduced MCE | Arginine*Arginine | 0.153 | 0.0313 |

[a]Reported as rate of formation or loss of the species monitored.
[b]Rates are derived from scaled estimates reported in JMP. The reported rates are 2-times the scaled estimates, as the scaled estimates are half-estimates.
[c]p-values ≤ 0.05 were considered statistically significant.

Results (Stress Conditions Agitation and Freezing and Thawing)

The stability of the garetosmab formulations listed in Table 24 were assessed after 4 or 8 cycles of freezing and thawing, or after 30, 60 or 120 minutes of agitation by vortexing. The quality attributes assessed were formation of molecular weight variants by SE-UPLC and MCE, formation of charge variants by CEX-UPLC and icIEF, visual inspection, pH, turbidity, protein concentration and recovery, and particulate levels. FIG. and FIG. show summaries of the impacts of varying the components of the formulation, in accordance with the DOE design, relative to the control formulation where all components of the formulation were nominal, after 8 cycles of freezing and thawing or 120 minutes of agitation by vortexing (indicated on the graphs as "delta control"). These results indicate that varying the formulation composition has no meaningful impact to the stability of garetosmab, relative to the control formulation, under the stress conditions employed.

Results (Long-Term Storage Temperature 2-8° C.)

Figure 7:
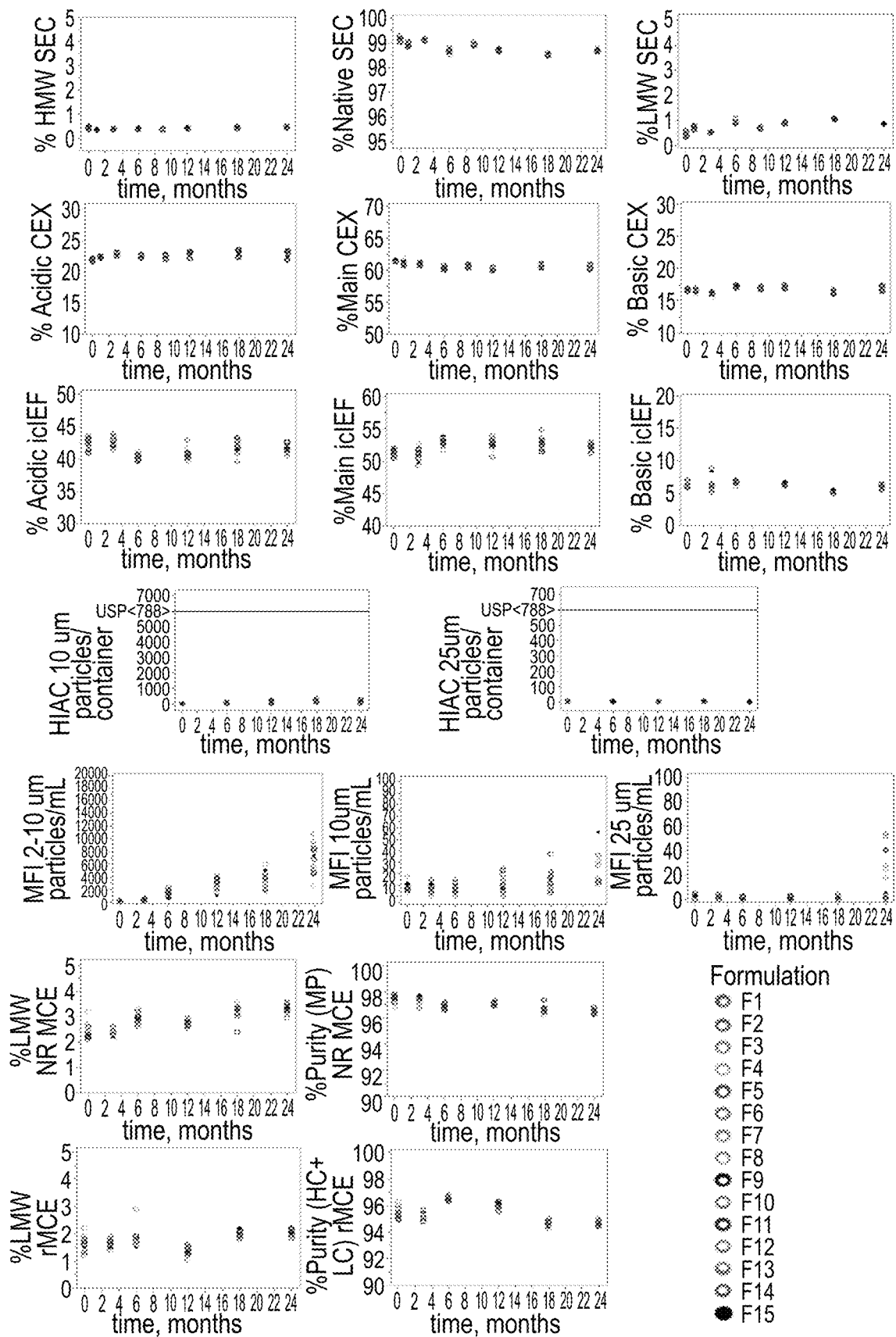
FIG. 7 shows the effects of varying the formulation components in accordance with the DOE design on the long-term stability of an anti-activin A antibody when the formulations were stored at 2-8° C. for 24 months (see Table 24 for formulation descriptions). The limits specified in USP<788> are indicated on the plots showing the particle levels by HIAC. Results are shown as a function of storage time at 2-8° C.

Garetosmab samples, prepared in accordance with the DOE design, in the formulations listed in Table 24 were stored at 2-8° C. Currently, 24 months of long-term stability data for the garetosmab robustness study are available. The effects of varying garetosmab concentration, pH, histidine concentration, arginine concentration, sucrose concentration and polysorbate 20 concentration on the long-term stability of garetosmab were examined. The quality attributes assessed were formation of molecular weight variants by SE-UPLC and MCE, formation of charge variants by CEX-UPLC and icIEF, visual inspection, pH, turbidity, protein concentration and recovery, and particulate levels. FIG.-7 show a summary of the impact of varying the components of the formulation, in accordance with the DOE design, relative to the control formulation where all components of the formulation were nominal. These results indicate that after 12 or 24 months of storage at 5° C., varying the formulations within the ranges tested resulted in no meaningful impact to the stability or quality of garetosmab. No precipitate or visible particulate was detected by either visual inspection or turbidity measurements (OD at 405 nm). No meaningful changes in protein recovery were observed (RP-UPLC). The pH of the formulations was stable. No appreciable increases in subvisible particulates were observed by HIAC, and no appreciable differences were observed in the subvisible particulate counts relative to the control formulation: for subvisible particulates measured by HIAC, all values were below the acceptable limits set by USP <788>; subvisible particles were also measured by MFI. Particle counts were variable but no meaningful changes in subvisible particles were observed relative to the control or between formulations for 10 μm or 25 μm particles. A trend of increasing 2-10 μm particle counts is observed with time, but the differences are not considered appreciable.

Figure 6:
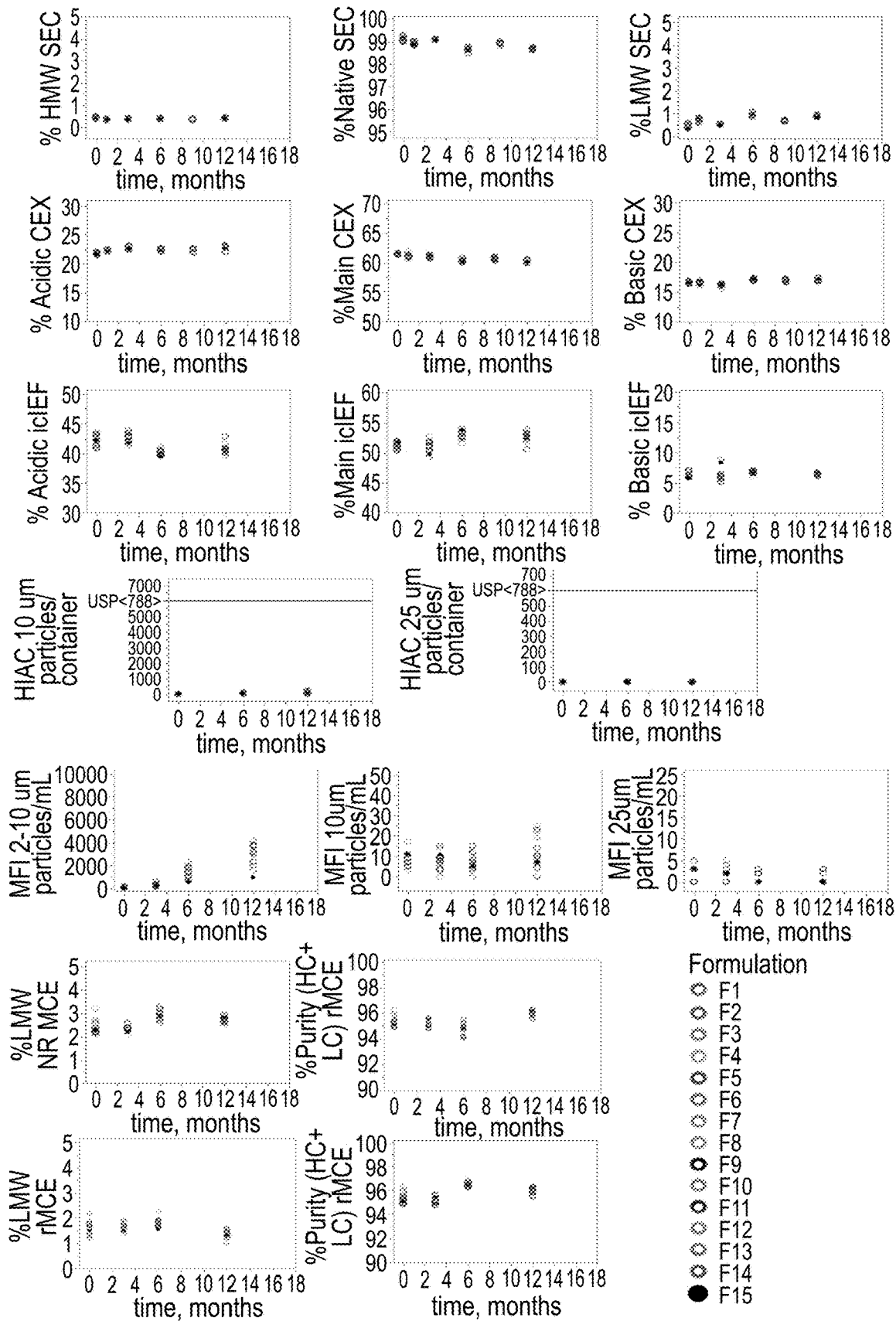
FIG. 6 shows the effects of varying the formulation components in accordance with the DOE design on the long-term stability of an anti-activin A antibody when the formulations were stored at 2-8° C. for 12 months (see Table 24 for formulation descriptions). The limits specified in USP<788> are indicated on the plots showing the particle levels by HIAC. Results are shown as a function of storage time at 2-8° C.

Statistical analysis of the results indicate that the differences among the formulations is primarily due to random variation and not due to variation in the factors (FIGS. 6-7); relative to the control formulation, no meaningful differences were observed in the levels of HMW species, LMW species or Native garetosmab as determined by SE-UPLC or MCE; and relative to the control formulation, no meaningful differences were observed in the levels of acidic or basic charge variants as determined by CEX-UPLC or icIEF.

The results from this study demonstrated that varying the formulation factors (garctosmab concentration, pH, histidine concentration, arginine concentration, sucrose concentration and polysorbate 20 concentration) within the studied ranges have no appreciable impact on the garetosmab long-term stability. The 60 mg/mL garetosmab formulation is robust with respect to all the quality attributes within the tested formulation composition range. Garetosmab Formulation Robustness Summary Formulation robustness studies were conducted to evaluate the effect of variations in formulation parameters on the garetosmab formulation stability. A DOE study that evaluated long-term storage, accelerated and stress stability demonstrated that variation in the formulation parameters, within the range studied, did not appreciably affect garctosmab quality and stability.

Specifically, the 60 mg/mL proposed commercial garetosmab formulation is robust against a ±10% variation in protein concentration, a ±20% variation in sucrose, arginine and/or histidine concentration, a ±50% variation in polysorbate 20 concentration, and/or a ±0.3 pH unit variation. Overall, the results from the 60 mg/mL garetosmab robustness study support that the variation in the composition of the garetosmab formulation within the ranges studied will not adversely impact the stability or quality of the garetosmab DP under the recommended storage conditions (2-8° C.).

Conclusions

Based on the results from the formulation development studies that were presented, as well as the clinical experience, the commercial garetosmab formulation for IV infusion was developed, which contains the following components: 60 mg/mL Garetosmab, 10 mM L-histidine, 5% (w/v) sucrose, 70 mM L-arginine HCl, 0.05% (w/v) polysorbate 20 and pH 6.3. This commercial IV formulation meets the goals defined for formulation development. The developed formulation is a liquid formulation in glass vials with a concentration of garetosmab sufficient to deliver a dose of 10 mg/kg garetosmab by intravenous (IV) infusion. The garetosmab DP is 60 mg/mL and is manufactured with a 5 mL withdrawable volume providing 300 mg per vial. The formulation is a near iso-osmolar formulation that is compatible with 0.9% Sodium Chloride Injection or 5% Dextrose Injection for IV infusion. The formulation is compatible with and stable in type 1 clear glass vials and standard serum stopper as the primary packaging system. The formulation is a sterile DP that supports long-term stability with a shelf-life of 24 months or longer at 2-8° C. No meaningful changes were observed in any garetosmab quality attributes when stored at 2-8° C. for up to 12 months, 18 months or 24 months. The formulation is a robust formulation that minimizes formation of garetosmab high molecular weight (HMW) species, minimizes changes in the relative distribution of garetosmab charge variant species, maintains subvisible particles at a safe level, and maintains the biological activity when subjected to handling and thermal stresses. The formulation is a formulation that is easily converted for use in subcutaneous (SC) administration. The garetosmab formulated drug substance is 200 mg/mL.

Example 5: Overages

There are no overages included in the formula; however, a slight overfill was included to compensate for the normal variations in fill volume encountered during an automated fill finish process and to ensure that the correct volume can be withdrawn from the vial. Clinical DP was manufactured with a 5.44 mL minimum fill volume. An overfill of 0.44 mL was contained in each vial, which is sufficient for an accurate withdrawal of 5.0 mL (300 mg) of DP from the vial.

The overage was not designed to compensate for losses during manufacture, degradation during manufacture, degradation during storage (shelf life), or to extend the expiration dating period. These overages were intended to enable the accurate withdrawal and administration of 5.0 mL DP (e.g., 300 mg of garetosmab).

Example 6: Methods Used To Assess Stability

The research stability of garetosmab DP was assessed using different assays. Color and appearance were assessed by visual inspection. Turbidity measured by increase in optical density (OD) at 405 nm. Particulate matter analysis was determined by light obscuration (HIAC). Particulate matter analysis was assessed by Micro-Flow Imaging™ (MFI). Protein concentration was assessed by reversed-phase ultra-performance liquid chromatography (RP-UPLC). Purity of each individual DP was assessed by using the following assays: size-exclusion ultra-performance liquid chromatography (SE-UPLC); reduced and non-reduced microchip capillary electrophoresis (MCE).

Charge variant analysis was determined using the following assays: Cation exchange UPLC (CEX-UPLC); and imaged capillary isoelectric focusing (iCIEF). Charge variants are reported as percent Region 1, Region 2, and Region 3. Region 1 corresponds to acidic species which elute before the Main Peak, Region 2 corresponds to the Main Peak, and Region 3 corresponds to basic species which elute after the Main Peak.

The Potency was assessed by use of a bioassay. The relative potency of each sample was determined by bioassay and is defined as: (IC50 reference sample/IC50 test sample)×100%. The measured potency of storage stability samples must be within 50-150% of the measured potency of the reference standard.

INFORMAL SEQUENCE LISTING

SEQ ID NO.: 1
GGSFSSHF

SEQ ID NO.: 2
ILYTGGT

SEQ ID NO.: 3
ARARSGITFTGIIVPGSFDI

SEQ ID NO.: 4
QSVSSSY

INFORMAL SEQUENCE LISTING

SEQ ID NO.: 5
GAS

SEQ ID NO.: 6
QQYGSSPWT

SEQ ID NO: 7
QVQLQESGPG LVKPSETLSL TCTVSGGSFS SHFWSWIRQP
PGKGLEWIGY ILYTGGTSFN PSLKSRVSMS VGTSKNQFSL
KLSSVTAADT AVYYCARARS GITFTGIIVP GSFDIWGQGT
MVTVSS

SEQ ID NO: 8
EIVLTQSPGT LSLSPGERAT LSCRASQSVS SSYLAWYQQK
PGQAPRLLIY GASSRATGIP DRFSGSGSGT DFTLTISRLE
PEDFAVYYCQ QYGSSPWTFG QGTKVEIK

What is claimed is:

1. A pharmaceutical formulation comprising: (i) 60 mg/mL±6 mg/mL of an anti-human Activin A antibody, or antigen-binding portion thereof; (ii) 10 mM±2 mM of a histidine buffer at pH of 6.3±0.3; (iii) 0.05% w/v±0.025% polysorbate 20; and (iv) 5% w/v±1% sucrose, and 70 mM±14 mM arginine,
wherein the antibody, or the antigen-binding portion thereof, comprises:
(a) a heavy chain complementarity determining region (HCDR) 1 having the sequence GGSFSSHF (SEQ ID NO: 1);
(b) an HCDR2 having the sequence ILYTGGT (SEQ ID NO: 2);
(c) an HCDR3 having the sequence ARARSGITFTGIIVPGSFDI (SEQ ID NO: 3);
(d) a light chain complementarity determining region (LCDR) 1 having the sequence QSVSSSY (SEQ ID NO: 4);
(e) an LCDR2 having the sequence GAS (SEQ ID NO: 5); and
(f) an LCDR3 having the sequence QQYGSSPWT (SEQ ID NO: 6), and
wherein after 12 months of storage at 2-8° C.:
at least 94% of the antibody, or the antigen-binding portion thereof, in the pharmaceutical formulation has native conformation;
at least 45% of the antibody, or the antigen-binding portion thereof, in the pharmaceutical formulation is the main charge variant; and
the antibody, or antigen-binding portion thereof, in the pharmaceutical formulation retains 95% of the potency of the antibody, or the antigen-binding portion thereof, prior to storage.

2. The pharmaceutical formulation of claim 1, wherein the antibody has a molecular weight of about 145,235.3 Da.

3. The pharmaceutical formulation claim 1, wherein after 12 months of storage at 2-8° C., at least 96% of the antibody, or the antigen-binding portion thereof, has native conformation, and at least 50% of the antibody, or the antigen-binding portion thereof, is the main charge variant.

4. The pharmaceutical formulation claim 1, wherein after 12 months of storage at 2-8° C., at least 98% of the antibody, or the antigen-binding portion thereof, has native conformation, and at least 55% of the antibody, or the antigen-binding portion thereof, is the main charge variant.

5. The pharmaceutical formulation claim 1, wherein after 18 months of storage at 2-8° C., at least 94% of the antibody, or the antigen-binding portion thereof, has native conformation, at least 45% of the antibody, or the antigen-binding portion thereof, is the main charge variant, and/or the antibody retains at least 95% of the potency of the antibody, or the antigen-binding portion thereof, prior to storage.

6. The pharmaceutical formulation claim 1, wherein after 18 months of storage at 2-8° C., at least 96% of the antibody, or the antigen-binding portion thereof, has native conformation, at least 50% of the antibody, or the antigen-binding portion thereof, is the main charge variant, and/or the antibody retains at least 95% of the potency of the antibody, or the antigen-binding portion thereof, prior to storage.

7. The pharmaceutical formulation claim 1, wherein after 18 months of storage at 2-8° C., at least 98% of the antibody, or the antigen-binding portion thereof, has native conformation, at least 55% of the antibody, or the antigen-binding portion thereof, is the main charge variant, and/or the antibody retains at least 95% of the potency of the antibody, or the antigen-binding portion thereof, prior to storage.

8. The pharmaceutical formulation claim 1, wherein after 24 months of storage at 2-8° C., at least 94% of the antibody, or the antigen-binding portion thereof, has native conformation, at least 45% of the antibody, or the antigen-binding portion thereof, is the main charge variant, and/or the antibody retains at least 99% of the potency of the antibody, or the antigen-binding portion thereof, prior to storage.

9. The pharmaceutical formulation claim 1, wherein after 24 months of storage at 2-8° C., at least 96% of the antibody, or the antigen-binding portion thereof, has native conformation, at least 50% of the antibody, or the antigen-binding portion thereof, is the main charge variant, and/or the antibody retains at least 99% of the potency of the antibody, or the antigen-binding portion thereof, prior to storage.

10. The pharmaceutical formulation claim 1, wherein after 24 months of storage at 2-8° C., at least 98% of the antibody, or the antigen-binding portion thereof, has native conformation, at least 55% of the antibody, or the antigen-binding portion thereof, is the main charge variant, and/or the antibody retains at least 99% of the potency of the antibody, or the antigen-binding portion thereof, prior to storage.

11. The pharmaceutical formulation of claim 1, wherein the formulation is contained in a container.

12. The pharmaceutical formulation of claim 11, wherein the container is a vial.

13. The pharmaceutical formulation of claim 12, wherein the vial is glass.

14. The pharmaceutical formulation of claim 13, wherein the glass is Type 1 borosilicate glass with a butyl rubber stopper.

15. The pharmaceutical formulation of claim 1, wherein the formulation is suitable for intravenous administration to a human subject in need thereof.

16. The pharmaceutical formulation of claim 1, wherein the formulation is suitable for subcutaneous administration to a human subject in need thereof.

17. The pharmaceutical formulation of claim 1, wherein the formulation is a liquid formulation.

18. The pharmaceutical formulation of claim 1, wherein the formulation is a lyophilized formulation.

19. A kit comprising a pharmaceutical formulation of claim 1, a container, and instructions of use thereof.

20. The kit of claim 19, wherein the container is a glass vial fitted with a chlorobutyl stopper.

21. A method of treating a disease or disorder associated with Activin A activity, the method comprising administration of a therapeutically effective amount of the pharmaceutical composition of claim 1 to a subject in need thereof.

22. The method of claim 21, wherein the disease or disorder associated with Activin A activity is Fibrodysplasia ossificans progressiva (FOP).

23. The pharmaceutical formulation of claim 1, wherein the antibody, or the antigen-binding portion thereof, comprises a heavy chain variable region comprising SEQ ID NO: 7 and a light chain variable region comprising SEQ ID NO: 8.

* * * * *

SEQUENCE LISTING

```
<160> NUMBER OF SEQ ID NOS: 10

<210> SEQ ID NO 1
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 1

Gly Gly Ser Phe Ser Ser His Phe
1               5

<210> SEQ ID NO 2
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Ile Leu Tyr Thr Gly Gly Thr
1               5

<210> SEQ ID NO 3
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Ala Arg Ala Arg Ser Gly Ile Thr Phe Thr Gly Ile Ile Val Pro Gly
1               5                   10                  15

Ser Phe Asp Ile
            20

<210> SEQ ID NO 4
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
```

<400> SEQUENCE: 4

Gln Ser Val Ser Ser Tyr
1               5

<210> SEQ ID NO 5
<211> LENGTH: 3
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Gly Ala Ser
1

<210> SEQ ID NO 6
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Gln Gln Tyr Gly Ser Ser Pro Trp Thr
1               5

<210> SEQ ID NO 7
<211> LENGTH: 126
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 7

Gln Val Gln Leu Gln Glu Ser Gly Pro Gly Leu Val Lys Pro Ser Glu
1               5                   10                  15

Thr Leu Ser Leu Thr Cys Thr Val Ser Gly Gly Ser Phe Ser Ser His
            20                  25                  30

Phe Trp Ser Trp Ile Arg Gln Pro Pro Gly Lys Gly Leu Glu Trp Ile
        35                  40                  45

Gly Tyr Ile Leu Tyr Thr Gly Gly Thr Ser Phe Asn Pro Ser Leu Lys
    50                  55                  60

Ser Arg Val Ser Met Ser Val Gly Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Ala Arg Ser Gly Ile Thr Phe Thr Gly Ile Ile Val Pro Gly Ser
            100                 105                 110

Phe Asp Ile Trp Gly Gln Gly Thr Met Val Thr Val Ser Ser
        115                 120                 125

<210> SEQ ID NO 8
<211> LENGTH: 108
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 8

```
Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Ser Ser Pro
                85                  90                  95

Trp Thr Phe Gly Gln Gly Thr Lys Val Glu Ile Lys
            100                 105
```

<210> SEQ ID NO 9
<211> LENGTH: 457
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 9

```
Gln Val Gln Leu Gln Glu Ser Gly Pro Gly Leu Val Lys Pro Ser Glu
1               5                   10                  15

Thr Leu Ser Leu Thr Cys Thr Val Ser Gly Gly Ser Phe Ser Ser His
            20                  25                  30

Phe Trp Ser Trp Ile Arg Gln Pro Pro Gly Lys Gly Leu Glu Trp Ile
        35                  40                  45

Gly Tyr Ile Leu Tyr Thr Gly Thr Ser Phe Asn Pro Ser Leu Lys
50                  55                  60

Ser Arg Val Ser Met Ser Val Gly Thr Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Ala Arg Ser Gly Ile Thr Phe Thr Gly Ile Ile Val Pro Gly Ser
            100                 105                 110

Phe Asp Ile Trp Gly Gln Gly Thr Met Val Thr Val Ser Ser Ala Ser
        115                 120                 125

Thr Lys Gly Pro Ser Val Phe Pro Leu Ala Pro Cys Ser Arg Ser Thr
130                 135                 140

Ser Glu Ser Thr Ala Ala Leu Gly Cys Leu Val Lys Asp Tyr Phe Pro
145                 150                 155                 160

Glu Pro Val Thr Val Ser Trp Asn Ser Gly Ala Leu Thr Ser Gly Val
                165                 170                 175

His Thr Phe Pro Ala Val Leu Gln Ser Ser Gly Leu Tyr Ser Leu Ser
            180                 185                 190

Ser Val Val Thr Val Pro Ser Ser Ser Leu Gly Thr Lys Thr Tyr Thr
        195                 200                 205

Cys Asn Val Asp His Lys Pro Ser Asn Thr Lys Val Asp Lys Arg Val
210                 215                 220

Glu Ser Lys Tyr Gly Pro Pro Cys Pro Pro Cys Pro Ala Pro Glu Phe
225                 230                 235                 240

Cys Pro Pro Cys Leu Gly Gly Pro Ser Val Phe Leu Phe Pro Pro Lys
```

-continued

```
                245                 250                 255
Pro Lys Asp Thr Leu Met Ile Ser Arg Thr Pro Glu Val Thr Cys Val
            260                 265                 270

Val Val Asp Val Ser Gln Glu Asp Pro Glu Val Gln Phe Asn Trp Tyr
        275                 280                 285

Val Asp Gly Val Glu Val His Asn Ala Lys Thr Lys Pro Arg Glu Glu
    290                 295                 300

Gln Phe Asn Ser Thr Tyr Arg Val Val Ser Val Leu Thr Val Leu His
305                 310                 315                 320

Gln Asp Trp Leu Asn Gly Lys Glu Tyr Lys Cys Lys Val Ser Asn Lys
                325                 330                 335

Gly Leu Pro Ser Ser Ile Glu Lys Thr Ile Ser Lys Ala Lys Gly Gln
            340                 345                 350

Pro Arg Glu Pro Gln Val Tyr Thr Leu Pro Pro Ser Gln Glu Glu Met
        355                 360                 365

Thr Lys Asn Gln Val Ser Leu Thr Cys Leu Val Lys Gly Phe Tyr Pro
    370                 375                 380

Ser Asp Ile Ala Val Glu Trp Glu Ser Asn Gly Gln Pro Glu Asn Asn
385                 390                 395                 400

Tyr Lys Thr Thr Pro Pro Val Leu Asp Ser Asp Gly Ser Phe Phe Leu
                405                 410                 415

Tyr Ser Arg Leu Thr Val Asp Lys Ser Arg Trp Gln Glu Gly Asn Val
            420                 425                 430

Phe Ser Cys Ser Val Met His Glu Ala Leu His Asn His Tyr Thr Gln
        435                 440                 445

Lys Ser Leu Ser Leu Ser Leu Gly Lys
    450                 455

<210> SEQ ID NO 10
<211> LENGTH: 215
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 10

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Ser Ser Pro
                85                  90                  95

Trp Thr Phe Gly Gln Gly Thr Lys Val Glu Ile Lys Arg Thr Val Ala
            100                 105                 110

Ala Pro Ser Val Phe Ile Glu Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140
```

-continued

```
Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215
```